(12) United States Patent
Sakade et al.

(10) Patent No.: US 11,174,195 B2
(45) Date of Patent: Nov. 16, 2021

(54) METHOD FOR ETCHING GLASS, ETCHING TREATMENT DEVICE AND GLASS SHEET

(71) Applicant: Nippon Electric Glass Co., Ltd., Shiga (JP)

(72) Inventors: Yoshiyuki Sakade, Shiga (JP); Hiroaki Nakahori, Shiga (JP); Takeshi Inui, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/633,325

(22) PCT Filed: Aug. 27, 2018

(86) PCT No.: PCT/JP2018/031547
§ 371 (c)(1),
(2) Date: Jan. 23, 2020

(87) PCT Pub. No.: WO2019/044757
PCT Pub. Date: Mar. 7, 2019

(65) Prior Publication Data
US 2020/0156990 A1 May 21, 2020

(30) Foreign Application Priority Data
Aug. 31, 2017 (JP) .............................. JP2017-167026

(51) Int. Cl.
| C03C 15/00 | (2006.01) |
| C03C 3/17 | (2006.01) |
| C03C 3/247 | (2006.01) |
| C09K 13/00 | (2006.01) |
| G02B 5/20 | (2006.01) |

(52) U.S. Cl.
CPC ............... *C03C 15/00* (2013.01); *C03C 3/17* (2013.01); *C03C 3/247* (2013.01); *C09K 13/00* (2013.01); *G02B 5/208* (2013.01)

(58) Field of Classification Search
None
See application file for complete search history.

(56) References Cited

U.S. PATENT DOCUMENTS

2002/0139475 A1\* 10/2002 Chen ...................... C03C 15/00
156/345.23
2012/0103520 A1 5/2012 Lee et al.

FOREIGN PATENT DOCUMENTS

| JP | 2004-2205 | 1/2004 |
| JP | 2010-168262 | 8/2010 |

(Continued)

OTHER PUBLICATIONS

International Preliminary Report on Patentability dated Mar. 3, 2020 in International (PCT) Patent Application No. PCT/JP2018/031547.

(Continued)

*Primary Examiner* — Roberts P Culbert
(74) *Attorney, Agent, or Firm* — Wenderoth, Lind & Ponack, L.L.P.

(57) ABSTRACT

Provided is an etching method for a glass, including an etching step (S2) of immersing a glass (G) in an etching liquid (E) to subject the glass (G) to etching treatment. The etching step (S2) includes causing the etching liquid (E) to relatively flow with respect to a surface (MS) of the glass (G), to thereby subject the glass (G) to the etching treatment.

17 Claims, 17 Drawing Sheets

(56) References Cited

FOREIGN PATENT DOCUMENTS

| JP | 2012-92001 | 5/2012 |
| JP | 2013-237579 | 11/2013 |
| JP | 2016-50119 | 4/2016 |
| WO | 2017/179283 | 10/2017 |

OTHER PUBLICATIONS

International Search Report dated Oct. 9, 2018 in International (PCT) Application No. PCT/JP2018/031547.

\* cited by examiner

METHOD FOR ETCHING GLASS, ETCHING TREATMENT DEVICE AND GLASS SHEET

TECHNICAL FIELD

The present invention relates to an etching method for a glass, an etching treatment apparatus, and a glass sheet.

BACKGROUND ART

Solid state image sensor devices, such as a CCD and a CMOS, are used in digital cameras, and the like. Each of those solid state image sensor devices has sensitivity to light in a wide region, and hence it is required to remove light in an infrared region so that the device is suited to a human sight. In Patent Literature 1 below, as a near-infrared light cut filter for removing light in an infrared region, an infrared light-absorbing glass sheet formed of fluorophosphate-based glass is disclosed. In Patent Literature 1, the thickness of the glass sheet is reduced by, for example, physical polishing with a double-sided polishing machine.

CITATION LIST

Patent Literature 1: JP 2010-168262 A

SUMMARY OF INVENTION

Technical Problem

In recent years, the solid state image sensor device has been required to be further reduced in size. Therefore, an infrared light-absorbing glass constituting the solid state image sensor device is also required to be further reduced in thickness. However, the infrared light-absorbing glass has low mechanical strength as compared to other general glasses. Therefore, when the thickness of a glass sheet is reduced by physical polishing as in Patent Literature 1, there is a problem in that the glass sheet is liable to be broken. In addition, also when a glass sheet having been processed to be thin is subjected to processing of an end surface, there is a problem in that the glass sheet is liable to be damaged.

In view of the foregoing, a technical object of the present invention is to process a glass to change the dimensions and surface state of the glass without causing breakage of the glass.

Solution to Problem

In order to achieve the object described above, according to one embodiment of the present invention, there is provided an etching method for a glass, comprising an etching step of immersing a glass in an etching liquid to subject the glass to etching treatment, wherein the etching step comprises causing the etching liquid to relatively flow with respect to a surface of the glass, to thereby subject the glass to the etching treatment.

By the method according to the one embodiment of the present invention, the etching liquid is caused to relatively flow along the surface of the glass in the etching step, and hence the etching treatment can be uniformly performed on the surface of the glass as compared to the case in which the etching liquid is not caused to flow. Through such etching treatment, a defect, such as microcracks, present in the glass in a previous step is removed. With this, the thickness of the glass can be reduced without causing breakage of the glass as compared to the case in which physical polishing is employed.

In the method according to the one embodiment of the present invention, it is desired that the glass comprise a glass sheet, and the etching step comprise immersing the glass sheet under a state in which the glass sheet is held by a holder. As described above, when the glass sheet is held by the holder, the etching treatment can be stably and uniformly performed on the surfaces of a plurality of glass sheets.

In the method according to the one embodiment of the present invention, it is desired that the etching step comprise moving the holder in the etching liquid. In this case, the etching step may comprise continuously rotating the holder in the etching liquid. Alternatively, the etching step may comprise intermittently rotating the holder in the etching liquid. When the holder is rotated, the glass sheet can be rotated about an axis line perpendicular to the surface thereof. With this, the etching liquid can be caused to relatively flow along the surface of the glass sheet.

In addition, in the method according to the one embodiment of the present invention, it is desired that the etching step comprise setting an etching rate to 0.001 mm/h or more and 0.1 mm/h or less, and rotating the holder at a speed of 10 rpm or less.

In the method according to the one embodiment of the present invention, it is desired that the glass be held in an upright posture by the holder. With this, the etching liquid can be suitably caused to relatively flow with respect to the surface of the glass.

In the method according to the one embodiment of the present invention, the holder may comprise: a frame body; and a tape stuck to the frame body. In this case, it is desired that the glass sheet be held by the holder under a state in which one main surface of the glass sheet is attached to the tape.

In the method according to the one embodiment of the present invention, it is desired that the etching step comprise causing the etching liquid to relatively flow with respect to the surface of the glass at a speed of 10 m/sec or less, to thereby subject the glass to the etching treatment. With this, the etching treatment can be uniformly performed on the surface of the glass with high accuracy.

In the method according to the one embodiment of the present invention, it is desired that the etching liquid be accommodated in an etching bath, and the etching step comprise a cooling step of cooling an upper region of the etching liquid. In this case, it is desired that the cooling step comprise bringing a cooling gas into contact with a liquid surface of the etching liquid.

In the etching liquid, as the etching treatment proceeds, particles of the glass having been removed by the etching settle out and deposit at the bottom of the etching bath. Therefore, in the etching bath, owing to a difference in concentration of the particles, a lower region of the etching liquid near the bottom thereof and the upper region of the etching liquid near the liquid surface thereof have different glass etching rates. That is, the etching treatment of a glass portion located in the lower region delays, and the etching treatment of a glass portion located in the upper region proceeds relatively rapidly. In the one embodiment of the present invention, the rate of the etching treatment of the glass portion located in the upper region is reduced by cooling the upper region of the etching liquid. With this, the rate of the etching treatment of the glass portion located in the upper region is balanced with the rate of the etching treatment of the glass portion located in the lower region, and thus the etching treatment can be uniformly performed on the surface of the glass.

In the method according to the one embodiment of the present invention, it is desired that the glass comprise a phosphate-based glass comprising as a composition, in terms of mass %, 25% or more of $P_2O_5$, and the etching liquid comprise an alkali salt of a chelating agent as an alkaline component.

Surfaces of the glass sheet may comprise: a first main surface; a second main surface; and an end surface connecting the first main surface and the second main surface, wherein the first main surface and the second main surface are each covered with a sheet member. In this case, the etching step may comprise causing the etching liquid to relatively flow with respect to only the end surface of the glass sheet, to thereby subject the glass to the etching treatment. With this, only the end surface can be processed without reducing the thickness of the glass sheet between the first main surface and the second main surface.

In order to achieve the object described above, according to one embodiment of the present invention, there is provided an etching treatment apparatus, comprising: an etching bath configured to accommodate an etching liquid; and a holder configured to hold a glass, wherein the holder is configured to be movable so as to cause the etching liquid to relatively flow with respect to a surface of the glass under a state in which the holder is immersed in the etching liquid.

With such configuration, the etching liquid can be caused to relatively flow along the surface of the glass by moving the holder in the etching liquid. With this, the thickness of the glass can be reduced without causing breakage of the glass as compared to the case in which physical polishing is employed.

In order to achieve the object described above, according to one embodiment of the present invention, there is provided a glass sheet, comprising as a composition, in terms of mass %, 25% or more of $P_2O_5$, wherein the glass sheet has an average thickness of 0.2 mm or less, wherein the glass sheet has a difference between a maximum thickness and a minimum thickness of 15 μm or less, and wherein the glass sheet has a spectral transmittance at a wavelength of 700 nm of 40% or less.

Advantageous Effects of Invention

According to the present invention, the glass can be processed without causing breakage of the glass.

DESCRIPTION OF EMBODIMENTS

Now, embodiments of the present invention are described with reference to the drawings. An etching method for a glass and an etching treatment apparatus according to an embodiment of the present invention are illustrated in FIG. 1 to FIG. 12.

Figure 1:
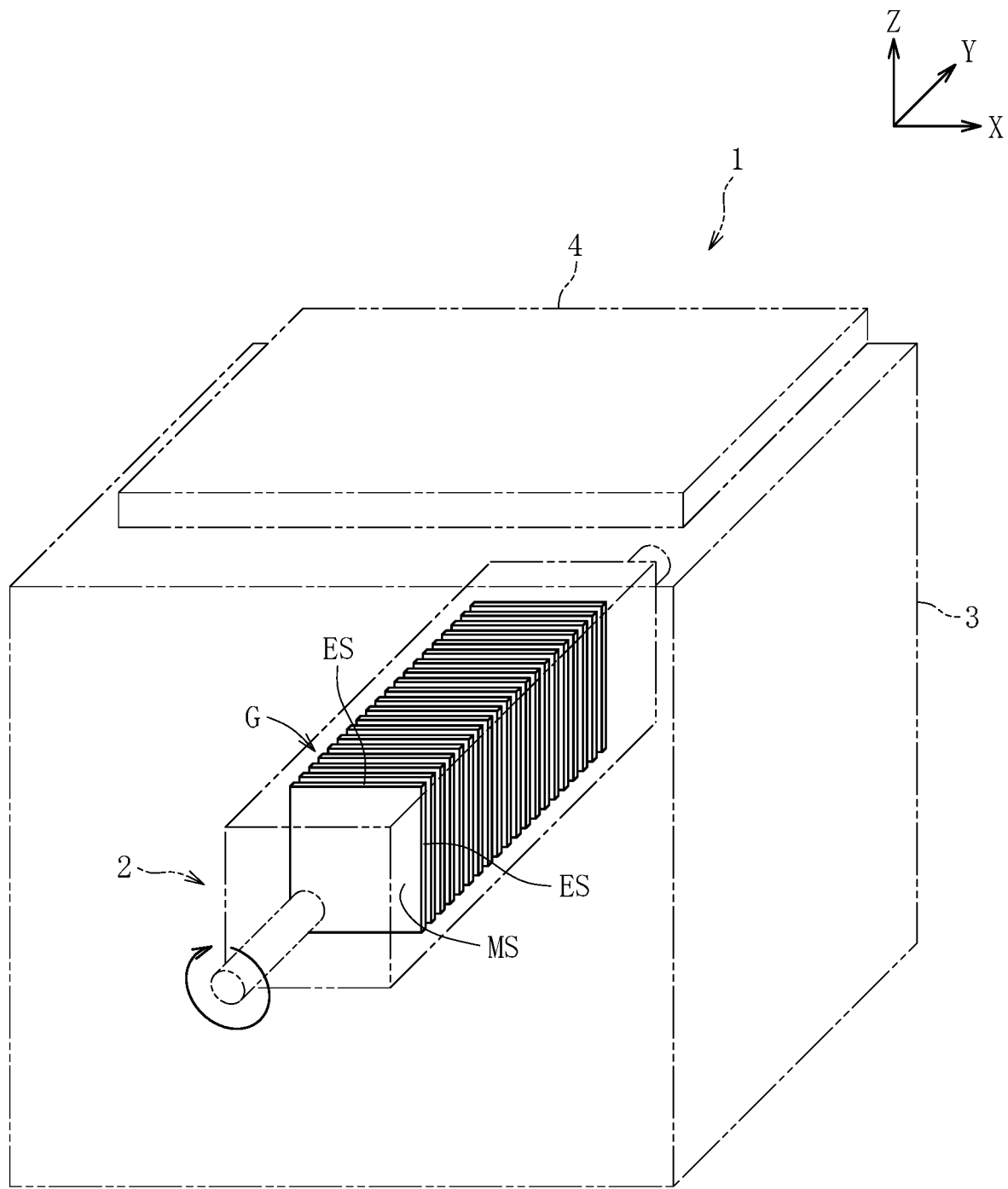
FIG. 1 is a perspective view of an etching treatment apparatus.
Figure 2:
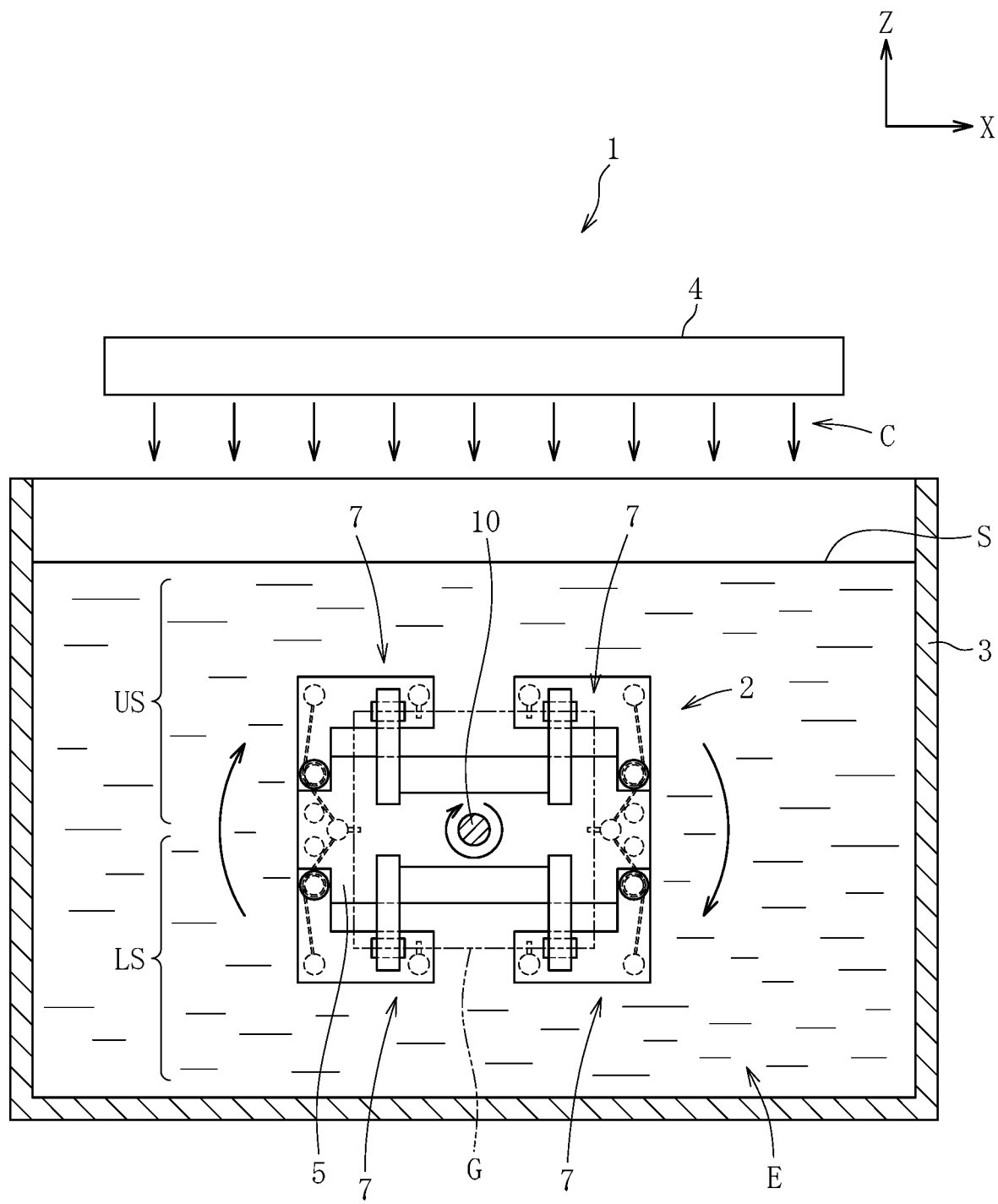
FIG. 2 is a front view of the etching treatment apparatus.

As illustrated in FIG. 1 and FIG. 2, an etching treatment apparatus 1 comprises: a holder 2 configured to hold a glass; an etching bath 3 configured to accommodate an etching liquid E; and a cooling device 4 for the etching liquid E. In this embodiment, a glass sheet G is presented as an example of the glass. The glass sheet G has a quadrangular shape, but the shape of the glass sheet G is not limited thereto. The glass sheet G has main surfaces (hereinafter simply referred to as "surfaces") MS including a front surface and a back surface, and an end surface ES connecting the surfaces MS. The end surface ES is formed so as to be almost perpendicular to each of the surfaces MS on each side of the glass sheet G having a quadrangular shape.

In this embodiment, the case in which a phosphate-based glass sheet G excellent in infrared light-absorbing function is subjected to etching treatment is presented as an example.

The thickness of the glass sheet G (a thickness between the surfaces MS including the front surface and the back surface) is set to 0.4 mm or less, preferably 0.3 mm or less. The thickness of the glass sheet G may be 0.2 mm or less, and is preferably 0.19 mm or less, more preferably 0.15 mm or less, still more preferably 0.12 mm or less. The glass sheet G is used as, for example, an infrared light cut filter for a solid state image sensor device. The glass sheet G, which has a small thickness of 0.2 mm or less, can significantly contribute to a reduction in size of the solid state image sensor device. When the thickness of the glass sheet G is too small, the glass sheet G is liable to be broken when lifted in a conveying step in some cases. Therefore, the thickness of the glass sheet G is preferably 0.05 mm or more, more preferably 0.08 mm or more.

The areas of the surfaces MS of the glass sheet G may each be set to 100 $mm^2$ or more and 25,000 $mm^2$ or less. The areas of the surfaces MS of the glass sheet G each fall within the range of preferably 400 mm² or more and 25,000 mm² or less, more preferably 1,000 mm² or more and 25,000 mm² or less, still more preferably 2,500 mm² or more and 25,000 mm² or less, particularly preferably 5,000 mm² or more and 25,000 mm² or less.

Now, the features of the glass sheet G having an infrared light-absorbing function are described in detail. It is desired that phosphate-based glass used for the glass sheet G be substantially free of F (fluorine). The "substantially free of" as used herein means that the phosphate-based glass may comprise, in terms of mass %, 0.1% or less of fluorine.

As such phosphate-based glass, for example, glass comprising, in terms of mass %, 25% to 60% of $P_2O_5$, 2% to 19% of $Al_2O_3$, 5% to 45% of RO (where R represents at least one kind selected from the group consisting of Mg, Ca, Sr, and Ba), 0% to 13% of ZnO, 8% to 20% of $K_2O$, 0% to 12% of $Na_2O$, and 0.3% to 20% of CuO, and being substantially free of fluorine may be used.

$P_2O_5$ is a component that forms a glass skeleton. The content of $P_2O_5$ is, in terms of mass %, preferably from 25% to 60%, more preferably from 30% to 55%, still more preferably from 40% to 50%. When the content of $P_2O_5$ is too small, vitrification becomes unstable in some cases. Meanwhile, when the content of $P_2O_5$ is too large, weather resistance is liable to be reduced in some cases.

$Al_2O_3$ is a component that further improves the weather resistance. The content of $Al_2O_3$ is, in terms of mass %, preferably from 2% to 19%, more preferably from 2% to 15%, still more preferably from 2.8% to 14.5%, particularly preferably from 3.5% to 14.0%. When the content of $Al_2O_3$ is too small, the weather resistance is not sufficient in some cases. Meanwhile, when the content of $Al_2O_3$ is too large, meltability is reduced, and a melting temperature is increased in some cases. When the melting temperature is increased, a Cu ion is liable to be reduced to be shifted from $Cu^{2+}$ to $Cu^+$, and it becomes difficult to obtain desired optical characteristics in some cases. Specifically, a light transmittance in a near-ultraviolet region and a visible region is liable to be reduced, or infrared light absorption characteristics are liable to be reduced in some cases.

RO (where R represents at least one kind selected from the group consisting of Mg, Ca, Sr, and Ba) is a component that improves the weather resistance, and improves the meltability. The content of RO is, in terms of mass %, preferably from 5% to 45%, more preferably from 7% to 40%, still more preferably from 10% to 35%. When the content of RO is too small, the weather resistance and the meltability are not sufficient in some cases. Meanwhile, when the content of RO is too large, the stability of the glass is liable to be reduced, and a crystal attributed to an RO component is liable to be precipitated in some cases.

Preferred content ranges of the RO components are as described below.

MgO is a component that improves the weather resistance. The content of MgO is, in terms of mass %, preferably from 0% to 15%, more preferably from 0% to 7%. When the content of MgO is too large, the stability of the glass is liable to be reduced in some cases.

CaO is a component that improves the weather resistance as with MgO. The content of CaO is, in terms of mass %, preferably from 0% to 15%, more preferably from 0% to 7%. When the content of CaO is too large, the stability of the glass is liable to be reduced in some cases.

SrO is a component that improves the weather resistance as with MgO. The content of SrO is, in terms of mass %, preferably from 0% to 12%, more preferably from 0% to 5%. When the content of SrO is too large, the stability of the glass is liable to be reduced in some cases.

BaO is a component that stabilizes the glass, and improves the weather resistance. The content of BaO is, in terms of mass %, preferably from 1% to 30%, more preferably from 2% to 27%, still more preferably from 3% to 25%. When the content of BaO is too small, the glass cannot be stabilized sufficiently, or the weather resistance cannot be improved sufficiently, in some cases. Meanwhile, when the content of BaO is too large, a crystal attributed to BaO is liable to be precipitated during forming in some cases.

ZnO is a component that improves the stability and the weather resistance of the glass. The content of ZnO is, in terms of mass %, preferably from 0% to 13%, more preferably from 0% to 12%, still more preferably from 0% to 10%. When the content of ZnO is too large, the meltability is reduced, and the melting temperature is increased. As a result, it becomes difficult to obtain desired optical characteristics in some cases. In addition, the stability of the glass is reduced, and a crystal attributed to a ZnO component is liable to be precipitated in some cases.

As described above, RO and ZnO each have an improving effect on the stability of the glass, and these effects are easily exhibited particularly when the content of $P_2O_5$ is small.

The ratio ($P_2O_5$/RO) of the content of $P_2O_5$ to the content of RO is preferably from 1.0 to 1.9, more preferably from 1.2 to 1.8. When the ratio ($P_2O_5$/RO) is too low, a liquidus temperature is increased, and devitrification attributed to RO is liable to be precipitated in some cases. Meanwhile, when the ratio ($P_2O_5$/RO) is too high, the weather resistance is liable to be reduced in some cases.

$K_2O$ is a component that reduces the melting temperature. The content of $K_2O$ is, in terms of mass %, preferably from 8% to 20%, more preferably from 12.5% to 19.5%. When the content of $K_2O$ is too small, the melting temperature is increased, and it becomes difficult to obtain desired optical characteristics in some cases. Meanwhile, when the content of $K_2O$ is too large, a crystal attributed to $K_2O$ is liable to be precipitated during forming, and the vitrification becomes unstable in some cases.

$Na_2O$ is also a component that reduces the melting temperature as with $K_2O$. The content of $Na_2O$ is, in terms of mass %, preferably from 0% to 12%, more preferably from 0% to 7%. When the content of $Na_2O$ is too large, the vitrification becomes unstable in some cases.

CuO is a component for absorbing near-infrared light. The content of CuO is, in terms of mass %, preferably from 0.3% to 20%, more preferably from 0.3% to 15%, still more preferably from 0.4% to 13% When the content of CuO is too small, it becomes difficult to obtain desired near-infrared light absorption characteristics in some cases. Meanwhile, when the content of CuO is too large, light transmittance in an ultraviolet region and a visible region is liable to be reduced in some cases. In addition, the vitrification becomes unstable in some cases. It is preferred that the content of CuO be appropriately adjusted depending on the thickness of the glass sheet in order to obtain desired optical characteristics.

In addition, other than the above-mentioned components, $B_2O_3$, $Nb_2O_5$, $Y_2O_3$, $La_2O_3$, $Ta_2O_5$, $CeO_2$, $Sb_2O_3$, or the like may be incorporated within the range in which the effects of the present invention are not impaired. Specifically, the contents of those components are each, in terms of mass %, preferably from 0% to 3%, more preferably from 0% to 2%.

In addition, the glass comprises as a composition, in terms of a cation percentage, 5% to 50% of $P^{5+}$, 2% to 30% of $Al^{3+}$, 10% to 50% of $R'^+$ (where R' represents at least one kind selected from the group consisting of Li, Na, and K), 20% to 50% of $R^{2+}$ (where $R^{2+}$ represents at least one kind selected from the group consisting of $Mg^{2+}$, $Ca^{2+}$, $Sr^{2+}$, $Ba^{2+}$, and $Zn^{2+}$), and 0.5% to 15% of $Cu^{2+}$, and in terms of an anion percentage, 5% to 80% of $F^-$ and 20% to 95% of $O^{2-}$.

The glass may have a composition further comprising, in terms of an anion percentage, 5% to 80% of $F^-$ in addition to the above-mentioned composition.

Phosphate-based glass comprising as a composition, in terms of a cation percentage, 40% to 50% of $P^{5+}$, 7% to 12% of $Al^{3+}$, 15% to 25% of $K^+$, 3% to 12% of $Mg^{2+}$, 3% to 6% of $Ca^{2+}$, 7% to 12% of $Ba^{2+}$, and 1% to 15% of $Cu^{2+}$, and in terms of an anion percentage, 5% to 80% of $F^-$ and 20% to 95% of $O^{2-}$ may be more preferably used.

Fluorophosphate-based glass comprising, in terms of a cation percentage, 20% to 35% of $P^{5+}$, 10% to 20% of $Al^{3+}$, 20% to 30% of $Li^+$, 0% to 10% of $Na^+$, 1% to 8% of $Mg^{2+}$, 3% to 13% of $Ca^{2+}$, 2% to 12% of $Sr^{2+}$, 2% to 8% of $Ba^{2+}$, 0% to 5% of $Zn^{2+}$, and 0.5% to 5% of $Cu^{2+}$, and in terms of an anion percentage, 30% to 65% of $F^-$ and 35% to 75% of $O^{2-}$ may be used as another glass having a preferred composition.

Fluorophosphate-based glass comprising as a composition, in terms of a cation percentage, 35% to 45% of $P^{5+}$, 8% to 12% of $Al^{3+}$, 20% to 30% of $Li^+$, 1% to 5% of $Mg^{2+}$, 3% to 6% of $Ca^{2+}$, 4% to 8% of $Ba^{2+}$, and 1% to 6% of $Cu^{2+}$, and in terms of an anion percentage, 10% to 20% of $F^-$ and 75% to 95% of $O^{2-}$ may be used as another glass having a preferred composition.

Fluorophosphate-based glass comprising, in terms of a cation percentage, 30% to 45% of $P^{5+}$, 15% to 25% of $Al^{3+}$, 1% to 5% of $Li^+$, 7% to 13% of $Na^+$, 0.1% to 5% of $K^+$, 1% to 8% of $Mg^{2+}$, 3% to 13% of $Ca^{2+}$, 6% to 12% of $Ba^{2+}$, 0% to 7% of $Zn^{2+}$, and 1% to 5% of $Cu^{2+}$, and in terms of an anion percentage, 30% to 45% of $F^-$ and 50% to 70% of $O^{2-}$ may be used as another glass having a preferred composition.

When the glass sheet G has each of the above-mentioned compositions, both higher light transmittance in a visible region and more excellent light absorption characteristics in an infrared region can be achieved. Specifically, a light transmittance at a wavelength of 400 nm is preferably 78% or more, more preferably 80% or more, and a light transmittance at a wavelength of 500 nm is preferably 83% or more, more preferably 85% or more. Meanwhile, a light transmittance at a wavelength of 700 nm is preferably 40% or less, more preferably 30% or less, and a light transmittance at a wavelength of 800 nm is preferably 20% or less, more preferably 15% or less.

The glass sheet G having the above-mentioned composition is formed into a sheet shape by a forming method, such as a casting method, a roll out method, a down-draw method, or a redraw method.

Now, a detailed configuration of the etching treatment apparatus 1 is described. As illustrated in FIG. 1 to FIG. 7, the holder 2 is configured to hold a plurality of glass sheets G at a predetermined interval. The holder 2 is formed of a metal (e.g., stainless steel) excellent in corrosion resistance to the etching liquid E, but the material of the holder 2 is not limited thereto. The holder 2 is configured to be movable in a vertical direction and a horizontal direction by a lifting device and a moving mechanism (not shown). The holder 2 is immersed in the etching liquid E accommodated in the etching bath 3 under the state in which the holder 2 holds the plurality of glass sheets G. The holder 2 is configured to rotate each of the glass sheets G by its rotation under the state in which the holder 2 is immersed in the etching liquid E.

Figure 3:
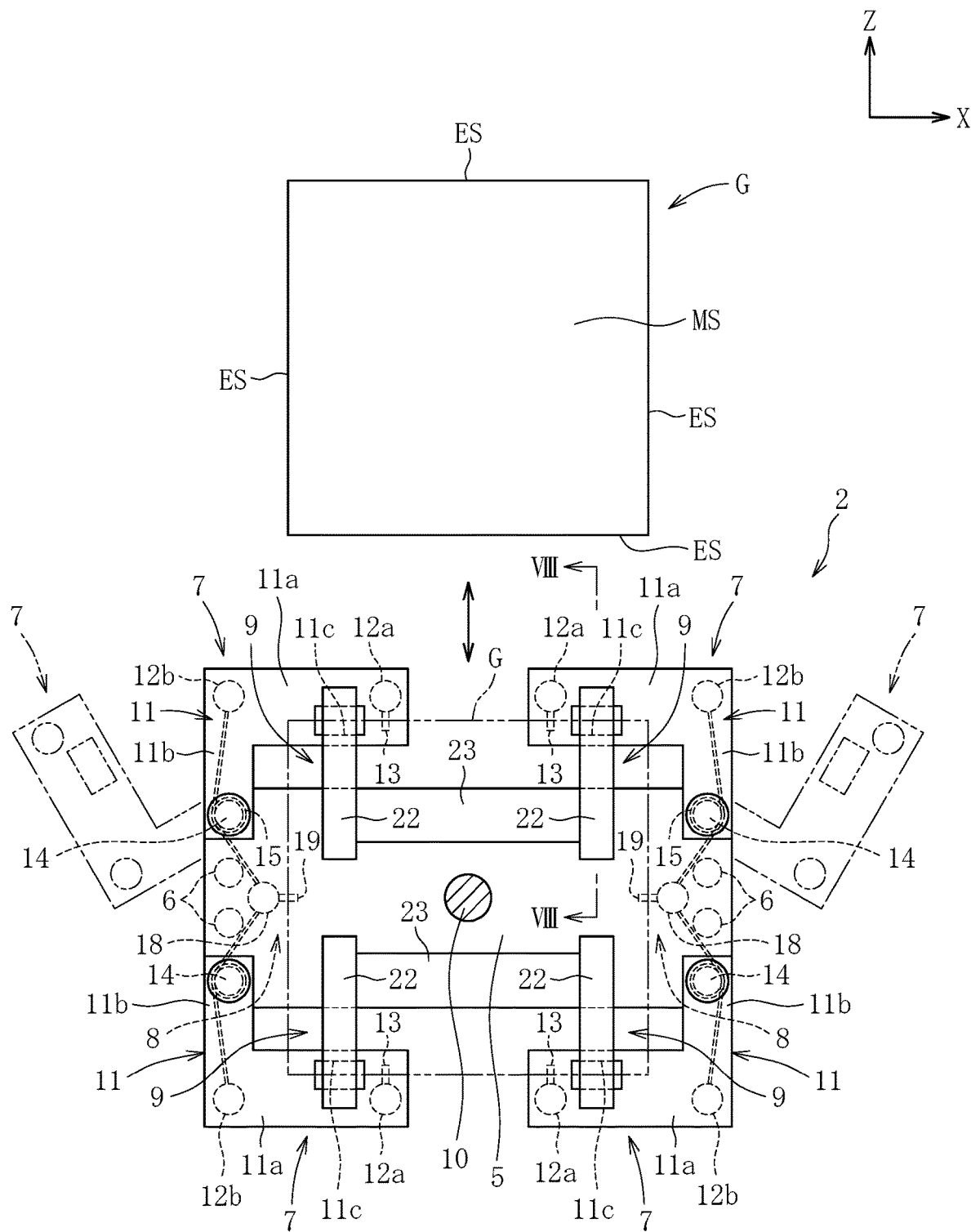
FIG. 3 is a front view of a holder.
Figure 4:
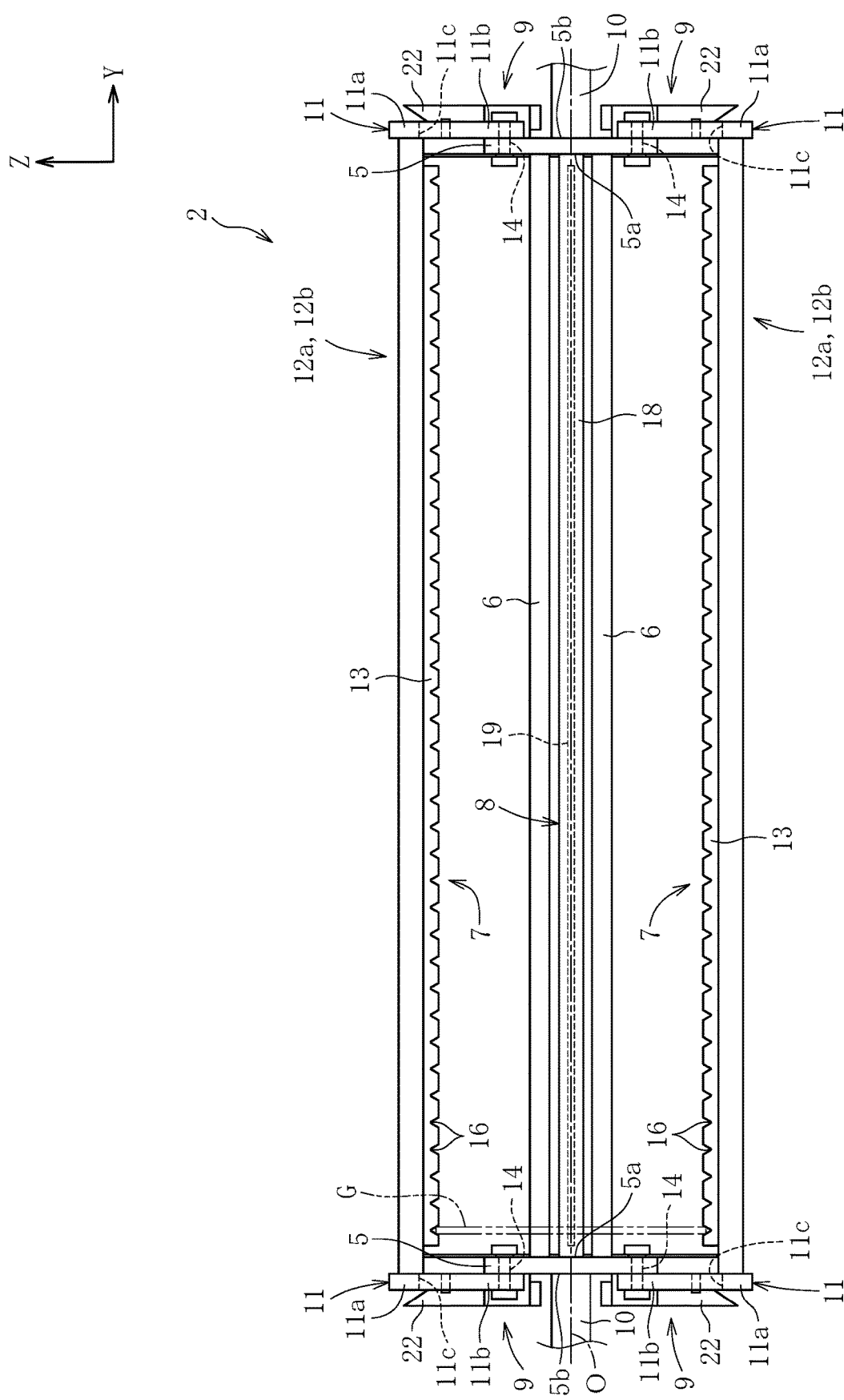
FIG. 4 is a side view of the holder.
Figure 5:
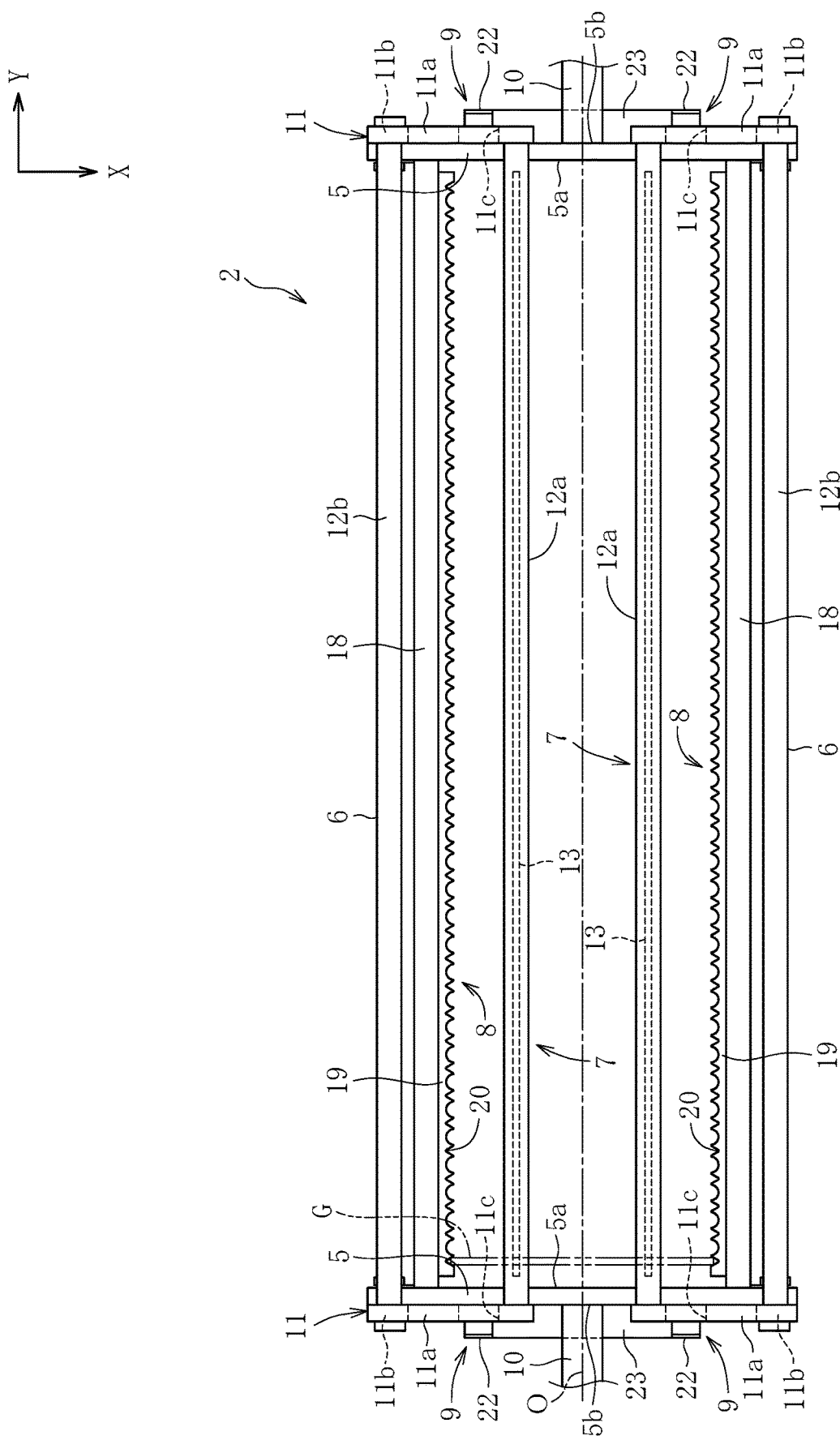
FIG. 5 is a plan view of the holder.

As illustrated in FIG. 3 to FIG. 5, the holder 2 comprises: a pair of base members 5; a connecting member 6 configured to connect the pair of base members 5; holding portions 7 and 8 each configured to hold the glass sheet G; a lock portion 9 configured to fix the holding portion 7; and a shaft portion 10 configured to rotate the holder 2 thereabout.

The pair of base members 5 are each formed of a sheet member having a rectangular shape. The base members 5 are arranged so as to face each other at a predetermined interval through intermediation of the connecting member 6. In the base members 5, surfaces facing each other are hereinafter referred to as "inner surfaces 5a," and surfaces opposite to the inner surfaces 5a are hereinafter referred to as "outer surfaces 5b."

The connecting member 6 is a rod-shaped member having a circular shape in a sectional view, but the shape of the connecting member 6 is not limited thereto. In this embodiment, the pair of base members 5 are connected to each other through intermediation of a plurality of connecting members 6.

The holding portions 7 and 8 comprise: first holding portions 7 configured to hold two sides facing each other (two sides parallel to each other) of the glass sheet G having a quadrangular shape; and second holding portions 8 configured to hold the other two sides (two sides parallel to each other) of the glass sheet G.

A plurality of first holding portions 7 (four first holding portions 7 in the illustrated example) are arranged in the base members 5 (see FIG. 3). The first holding portions 7 are supported by the base members 5 in a rotationally movable manner. Each of the first holding portions 7 comprises: a pair of base materials 11; connecting members 12a and 12b configured to connect the base materials 11; and a fixing portion (hereinafter referred to as "first fixing portion") 13 configured to determine the position of the glass sheet G.

The base material 11 is arranged on an outer surface 5b side of the base member 5. As illustrated in FIG. 3, the base material 11 comprises: a first portion 11a having an elongated shape; and a second portion 11b protruding at a right angle from an end portion of the first portion 11a. The first portion 11a comprises an opening 11c with which part of the lock portion 9 engages. The opening 11c has a quadrangular shape, but the shape of the opening 11c is not limited thereto.

The second portion 11b is formed so that an end portion thereof is integrated with the first portion 11a and the other end portion thereof is fixed to the base member 5. Specifically, the second portion 11b is supported by the base member 5 so as to be rotationally movable about a support shaft 14. With this, as illustrated in FIG. 3, the first holding portion 7 is configured to be changeable in posture between a first posture indicated by the solid line and a second posture indicated by the two-dot chain line. The first posture is a posture (holding posture) by which the glass sheet G can be held, and the second posture is a posture (retreating posture) by which the glass sheet G is released from being held, and thus the glass sheet G can be inserted in and removed from an inner space of the holder 2 (space between the inner surfaces 5a of the pair of base members 5).

As illustrated in FIG. 3, the support shaft 14 is configured to support an urging member 15 configured to urge the first holding portion 7 in a predetermined direction. The urging member 15 is formed of a torsion coil spring, but the material of the urging member 15 is not limited thereto. An end portion of the urging member 15 is fixed to the connecting member 6 for the base members 5, and the other end portion of the urging member 15 is fixed to the connecting member 12a of the first holding portion 7. The urging member 15 is configured to urge the first holding portion 7 so that the first portion 11a is separated from the base member 5. That is, the urging member 15 is configured to urge the first holding portion 7 so that the first holding portion 7 moves from the first posture (holding posture) toward the second posture (retreating posture).

The connecting members 12a and 12b are each formed of a rod-shaped member having a circular shape in a sectional view, but the shapes of the connecting members 12a and 12b are not limited thereto. The connecting members 12a and 12b are each configured to connect the first portions 11a of the pair of base materials 11. In this embodiment, the base materials 11 are connected to each other through intermediation of two connecting members 12a and 12b, but the number of the connecting members 12a and 12b is not limited thereto. The connecting members 12a and 12b comprise: a first connecting member 12a configured to connect end portions of the first portions 11a; and a second connecting member 12b configured to connect the other end portions of the first portions 11a (end portions on a second portion 11b side).

Figure 6:
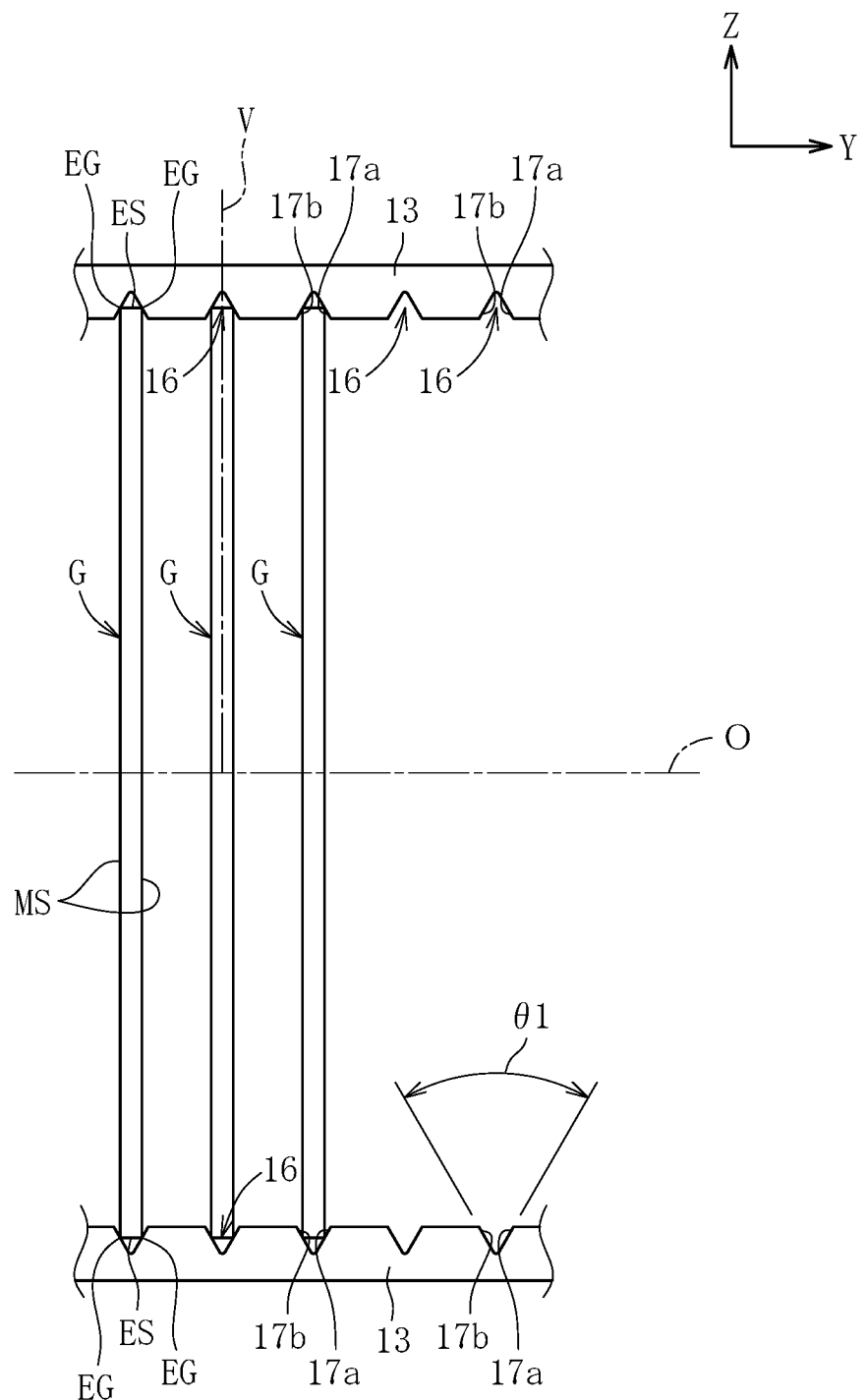
FIG. 6 is a side view for illustrating a first fixing portion.

A first fixing portion 13 is arranged on the first connecting member 12a. The first fixing portion 13 is formed of a synthetic resin, but the material of the first fixing portion 13 is not limited thereto. The first fixing portion 13 is a sheet member having an elongated shape along a longitudinal direction of the first connecting member 12a. As illustrated in FIG. 4 and FIG. 6, the first fixing portion 13 comprises a plurality of recesses 16 capable of being brought into contact with one side of the glass sheet G. The recesses 16 are formed at a certain interval (pitch) along a longitudinal direction of the holder 2. Each of the recesses 16 comprises a pair of oblique side portions 17a and 17b to be brought into contact with an edge portion EG of the one side of the glass sheet G. The oblique side portions 17a and 17b are each inclined at a predetermined angle with respect to a direction parallel to the surfaces MS of the glass sheet G. In other words, the pair of oblique side portions 17a and 17b intersect with each other at a predetermined angle. An intersection angle θ1 between the oblique side portions 17a and 17b (see FIG. 6) is desirably set to 40° or more and 100° or less.

As illustrated in FIG. 4 and FIG. 5, the second holding portions 8 are arranged between the pair of base members 5. The second holding portions 8 comprise: a pair of connecting members 18 configured to connect the pair of base members 5; and fixing portions (hereinafter referred to as "second fixing portions") 19 configured to determine the position of the glass sheet G.

The pair of connecting members 18 are arranged so as to be axisymmetric with respect to an axis line O passing through the center of the shaft portion 10 (see FIG. 5). The second fixing portions 19 are each formed of a synthetic resin into a sheet shape, but the materials of the second fixing portions 19 are not limited thereto. The second fixing portions 19 are fixed to the respective connecting members 18. The second fixing portion 19 fixed to one of the connecting members 18 and the second fixing portion 19 fixed to the other one of the connecting members 18 are arranged so as to face each other (see FIG. 5 and FIG. 7).

Figure 7:
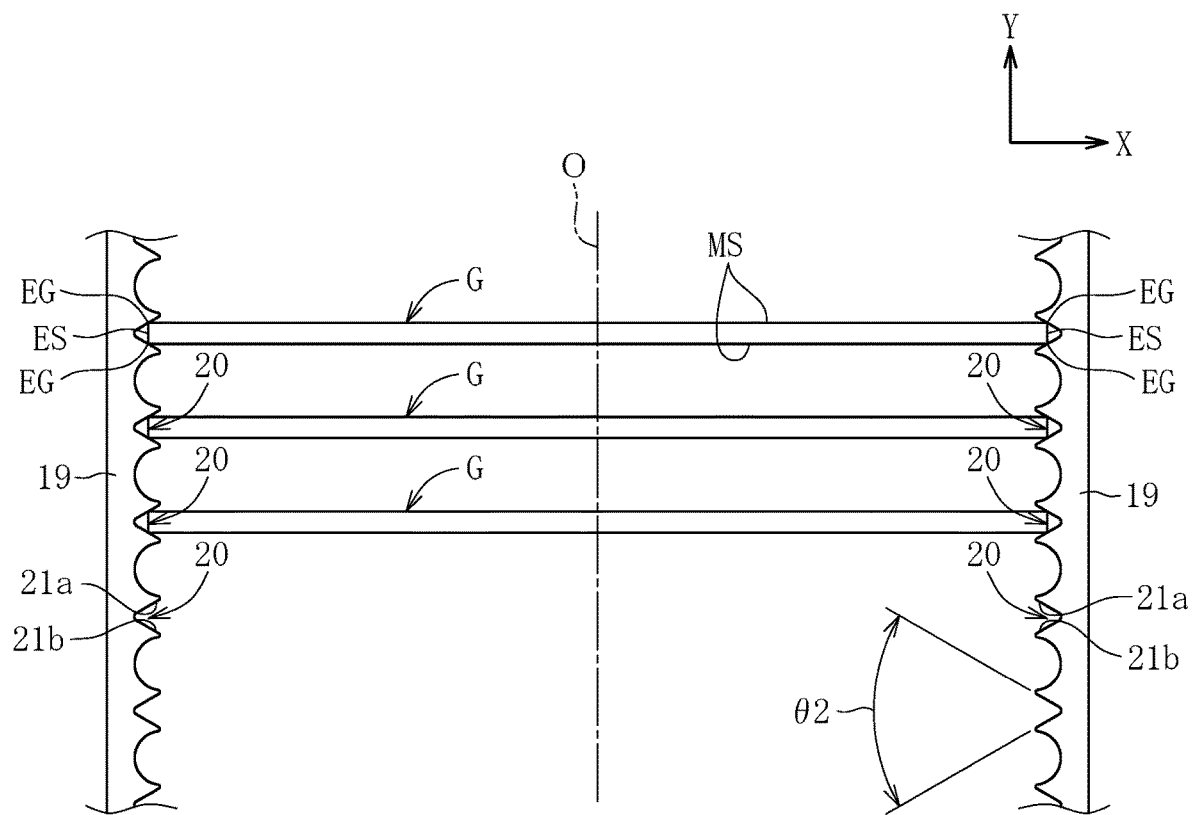
FIG. 7 is a plan view for illustrating a second fixing portion.

As illustrated in FIG. 5 and FIG. 7, each of the second fixing portions 19 comprises a plurality of recesses 20 to be brought into contact with an edge portion EG of the glass sheet G. The recesses 20 have the same configurations as the recesses 16 of the first fixing portion 13. That is, the plurality of recesses 20 are formed at a certain interval (pitch) along the longitudinal direction of the holder 2, and the interval is equal to the interval between the recesses 16 of the first fixing portion 13. Further, each of the recesses 20 comprises oblique side portions 21a and 21b to be brought into contact with the edge portion EG of the glass sheet G. The oblique side portions 21a and 21b are each inclined at a predetermined angle with respect to a direction parallel to the surfaces MS of the glass sheet G. An intersection angle θ2 (see FIG. 7) between the oblique side portions 21a and 21b is set to 40° or more and 100° or less, but the range of the intersection angle is not limited thereto. The intersection angle θ2 is appropriately set depending on the thickness and size of the glass sheet G.

Figure 8:
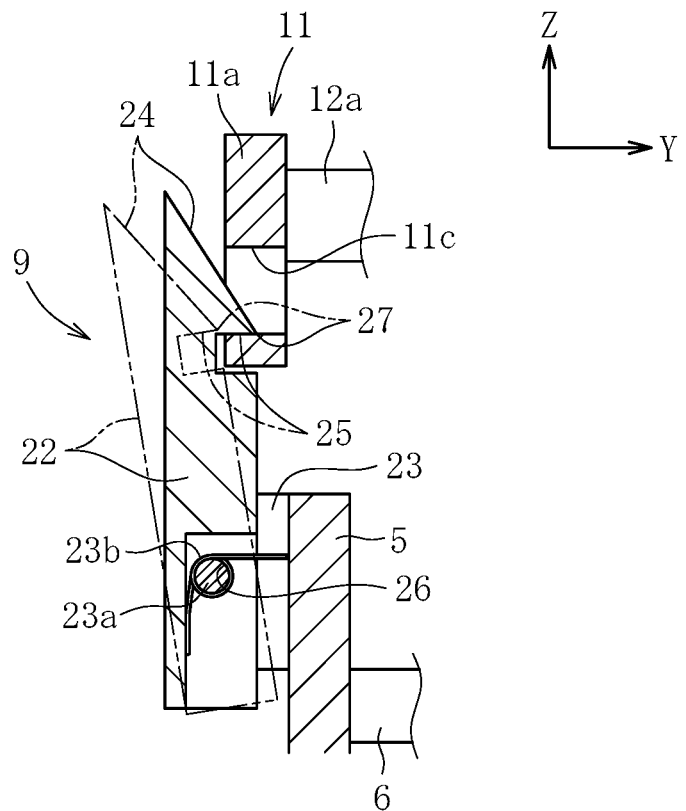
FIG. 8 is a sectional view taken along the line VIII-VIII of FIG. 3.

As illustrated in FIG. 8, the lock portion 9 comprises: a lock member 22; and a support member 23 configured to support the lock member 22 in a rotationally movable manner.

The lock member 22 is formed of a rod-shaped member, but the shape of the lock member 22 is not limited thereto. The lock member 22 is arranged so that an end portion thereof protrudes from one side of the base member 5, and the other end portion thereof overlaps with the outer surface 5b of the base member 5. The lock member 22 is configured to be changeable in posture between a posture (fixing posture, indicated by the solid line of FIG. 8) by which the lock portion 9 fixes the first holding portion 7 and a posture (retreating posture, indicated by the two-dot chain line of FIG. 8) by which the lock portion 9 retreats from the fixing posture so that the first holding portion 7 is released from being fixed. The lock member 22 is urged in a direction moving from the retreating posture toward the fixing posture by an urging member 23b. Accordingly, the lock member 22 maintains the fixing posture even under the state of not holding the first holding portion 7.

The lock member 22 comprises: an inclined surface 24 to be brought into contact with the first portion 11a of the first holding portion 7; an engaging surface 25 to be inserted in the opening 11c of the first portion 11a to engage with the first portion 11a; and a hole 26 in which part of the support member 23 is inserted, when the first holding portion 7 is changed in posture from the retreating posture to the fixing posture.

The inclined surface 24 is a guide surface for changing the posture of the lock member 22 from the fixing posture to the retreating posture when the first holding portion 7 is fixed. The inclined surface 24 is connected to the engaging surface 25. The engaging surface 25 is a surface formed at a predetermined angle with respect to the inclined surface 24. With such configuration, a protrusion 27 is formed between the engaging surface 25 and the inclined surface 24.

The hole 26 formed in the lock member 22 is a circular hole formed so as to penetrate through the support member 23 in a direction perpendicular to a thickness direction of the base member 5.

The support member 23 is fixed to the outer surface 5b of the base member 5. The support member 23 comprises a shaft portion 23a configured to support the lock member 22. The shaft portion 23a is inserted in the hole 26 of the lock member 22. The shaft portion 23a is configured to support the urging member 23b configured to urge the lock member 22. The urging member 23b is formed of a torsion coil spring, but the material of the urging member 23b is not limited thereto. An end portion of the urging member 23b is brought into contact with the lock member 22, and the other end portion of the urging member 23b is brought into contact with the outer surface 5b of the base member 5. The urging member 23b is configured to urge the lock member 22 in a direction moving from the retreating posture to the fixing posture.

The shaft portion 10, which is configured to rotate the holder 2, is fixed to the pair of base members 5. A pair of shaft portions 10 are arranged so as to protrude from the outer surfaces 5b of the base members 5. The shaft portions 10 are each connected to an electric motor or any other driving source. When the shaft portions 10 are rotated by the driving source, the holder 2 is rotated about the shaft portions 10.

The etching bath 3 has such volume that the etching bath 3 is prevented from being brought into contact with the holder 2 and the shaft portions 10 when the holder 2 is immersed in the etching liquid E. The etching liquid E to be accommodated in the etching bath 3 is formed of, for example, an alkaline detergent when the glass sheet G to be treated is formed of phosphate-based glass as described above. The alkaline detergent is not particularly limited, and there may be used a detergent containing, for example, an alkaline component, such as Na or K, a surfactant, such as triethanolamine, benzyl alcohol, or glycol, and water or an alcohol.

As an alkaline component contained in the alkaline detergent, an alkali salt of a chelating agent, such as an aminopolycarboxylic acid, is preferably contained. Examples of the alkali salt of the aminopolycarboxylic acid include sodium salts and potassium salts of diethylenetriaminepentaacetic acid, ethylenediaminetetraacetic acid, triethylenetetraaminehexaacetic acid, and nitrilotriacetic acid. Of those, pentasodium diethylenetriaminepentaacetate, tetrasodium ethylenediaminetetraacetate, hexasodium triethylenetetraaminehexaacetate, and trisodiumnitrilotriacetate are preferably used, and pentasodium diethylenetriaminepentaacetate is particularly preferably used.

The cooling device 4 is arranged above the etching bath 3 under the state in which the holder 2 is immersed in the etching liquid E in the etching bath 3. The cooling device 4 is configured to jet a cooling gas C toward a liquid surface S of the etching liquid E accommodated in the etching bath 3.

Now, a treatment method (etching method) for the glass sheet G with the etching treatment apparatus 1 having the above-mentioned configuration is described.

Figure 9:
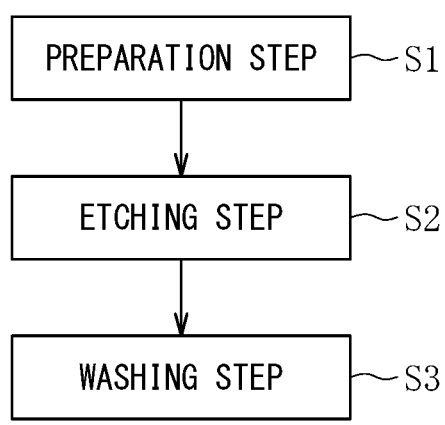
FIG. 9 is a flowchart of an etching method for a glass.

As illustrated in FIG. 9, the method of the present invention mainly comprises: a preparation step S1 of accommodating the glass sheet G in the holder 2; an etching step S2 of immersing the holder 2 that holds the glass sheet G in the etching liquid E in the etching bath 3 to subject the glass sheet G to etching treatment; and a washing step S3 of washing the glass sheet G having been subjected to the etching treatment.

As illustrated in FIG. 3, in the preparation step S1, two (a pair of) first holding portions 7 adjacent to each other are each set in the second posture indicated by the two-dot chain line, and the remaining two first holding portions 7 are each set in the first posture. When part of the first holding portions 7 are set in the second posture as described above, the state in which the holder 2 can hold the glass sheet G in an inside thereof (space between the inner surfaces 5a of the pair of base members 5) is achieved.

Next, the glass sheet G to be subjected to the etching treatment is accommodated in the holder 2. When the glass sheet G is accommodated in the holder 2, one side of the glass sheet G having a quadrangular shape is supported by the two first holding portions 7 in the first posture, and two sides of the glass sheet G perpendicular to the one side are supported by the pair of second holding portions 8. More specifically, three sides of the glass sheet G are supported by the recesses 16 of the first fixing portions 13 in the first holding portions 7 in the first posture and by the recesses 20 of the second fixing portions 19 of the pair of second holding portions 8. After a predetermined number of glass sheets G are accommodated in the holder 2, the two first holding portions 7 in the second posture are changed to the first posture. The glass sheet G has a thickness of 0.2 mm or more before the etching step S2. The thickness of the glass sheet G is reduced to 0.2 nm or less through the subsequent etching step S2.

Now, operations of the first holding portion 7 and the lock portion 9 at the time of changing the first holding portion 7 from the second posture to the first posture are described.

When the first holding portion 7 takes the second posture (retreating posture), the lock member 22 of the lock portion 9 takes the fixing posture by the action of the urging member 23b. In this state, in changing the posture of the first holding portion 7 to the first posture, part of the first holding portion 7 is caused to abut against the inclined surface 24 of the lock member 22.

Figure 10A:
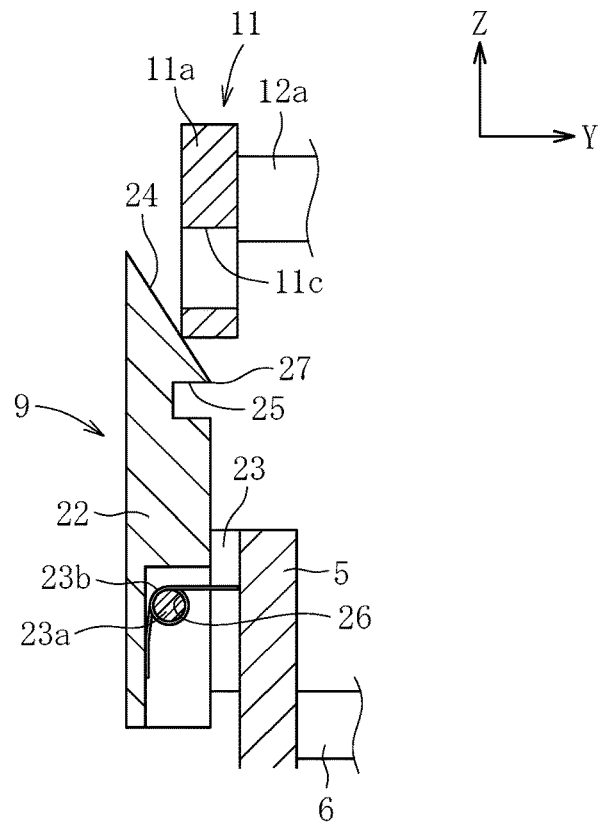
FIG. 10A is a sectional view for illustrating an operation of part of the holder.
Figure 10B:
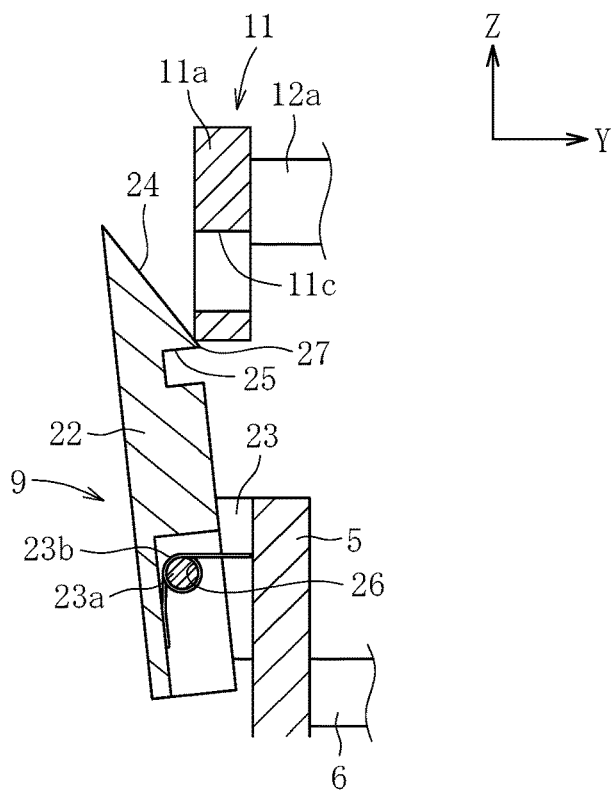
FIG. 10B is a sectional view for illustrating an operation of the part of the holder.

That is, as illustrated in FIG. 10A, when the first holding portion 7 is moved from the second posture toward the first posture, the inclined surface 24 of the lock member 22 is brought into contact with part of the first portion 11a of the first holding portion 7. When the first holding portion 7 is further moved from this state toward the first posture, the inclined surface 24 is pressed by the first holding portion 7 and changed in posture so as to be apart from the base member 5 (see FIG. 10B). When the first holding portion 7 is further moved and changed to the first posture, the lock member 22 is changed to the retreating posture (see the state indicated by the two-dot chain line of FIG. 8), and the protrusion 27 of the lock member 22 enters the opening 11c of the first holding portion 7. With this, the lock member 22 takes the fixing posture again. At this time, the first holding portion 7 is urged by the urging member 15 in a direction moving toward the second posture, and hence by the action, an edge portion of the opening 11c is brought into contact with the engaging surface 25 of the lock member 22. The lock member 22 fixes the first holding portion 7 in the first posture (holding posture) by maintaining the above-mentioned state.

When the first holding portion 7 is set in the first posture as described above, the remaining one side of the glass sheet G is brought into contact with the recess 16 (oblique side portions 17a and 17b) of the first fixing portion 13 in the first holding portion 7. With this, all the sides of the glass sheet G having a quadrangular shape are supported by four first fixing portions 13 according to the first holding portions 7 and two second fixing portions 19 according to the second holding portions 8. In this case, each glass sheet G is held by the holder 2 in an upright posture along a vertical line V almost perpendicular to the axis line O connecting the pair of shaft portions 10 in the holder 2 (see FIG. 6). With this, the plurality of glass sheets G are supported by the holder 2 at a certain interval. In this case, the interval between the glass sheets G is set to preferably 2 mm or more, more preferably 4 mm or more. The case in which the interval between the glass sheets G is too small is not preferred because, of the plurality of glass sheets G supported by the holder 2, a glass sheet G positioned on an outermost side and other glass sheets G have different etching amounts. When unused recesses 16 and 20 are interposed between two glass sheets G adjacent to each other by, for example, using the plurality of recesses 16 of the first fixing portion 13 alternately and using the plurality of recesses 20 of the second fixing portion 19 alternately, the interval between the two glass sheets G adjacent to each other can be set to be larger than in the case of using all the recesses 16 and 20. When the preparation step S1 is completed as described above, the subsequent etching step S2 is performed.

In the etching step S2, the holder 2 is immersed in the etching liquid E in the etching bath 3. In this case, it is desired that the entirety of the holder 2 be immersed in the etching liquid E so that the entirety of the glass sheet G is immersed in the etching liquid E.

Figure 11:
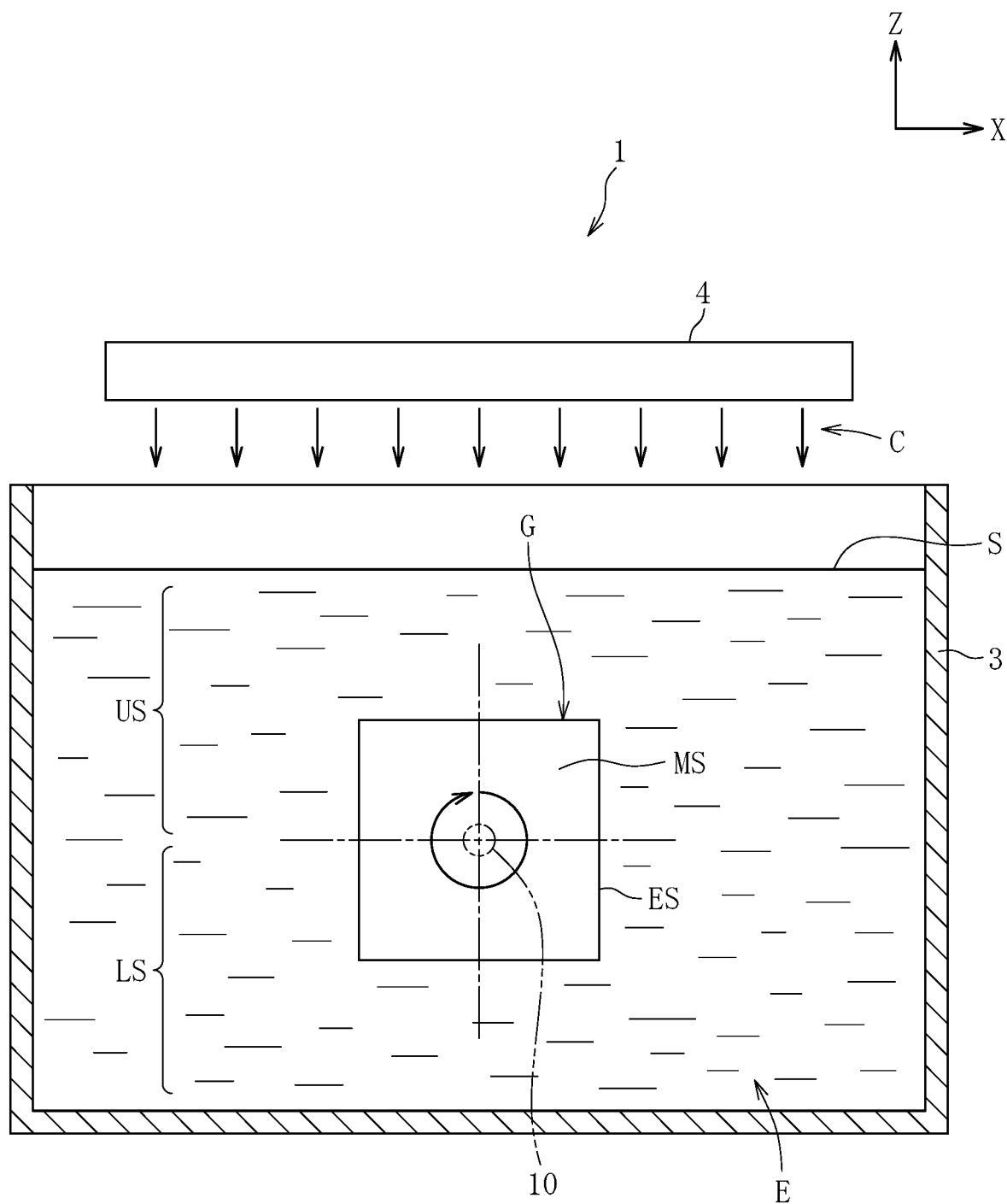
FIG. 11 is a sectional view for illustrating a step of the etching method for a glass.

After that, the holder 2 is rotated by driving the shaft portion 10. With this, the glass sheet G is rotated along with the holder 2. At this time, as illustrated in FIG. 11, the glass sheet G is rotated about the axis line (axis line O connecting the pair of shaft portions 10) perpendicular to the surfaces MS. With this, the etching liquid E is caused to relatively flow along the surfaces MS of the glass sheet G.

The speed at which the etching liquid E is caused to relatively flow along the surfaces MS of the glass sheet G is preferably 10 m/sec or less, more preferably 3 m/sec or less. When the etching liquid E is caused to relatively flow along the surfaces MS of the glass sheet G, the flowing of the etching liquid E is interrupted at a site in which the glass sheet G and the holder 2 are brought into contact with each other, and hence etching amounts on the surfaces MS of the glass sheet G are liable to vary locally. When the flowing speed is controlled to be low as described above, such variation can be suppressed.

The rotation speed of the glass sheet G is desirably set to 10 rpm or less, but is not limited to this range. The rotation speed of the glass sheet G is appropriately adjusted depending on various conditions, such as the size and thickness of the glass sheet G, and the number of glass sheets G to be treated. In this embodiment, the glass sheet G is rotationally driven at a speed of, for example, one rotation per hour (about 0.017 rpm, 360°/h). The glass sheet G may be rotated continuously or intermittently.

Figure 12:
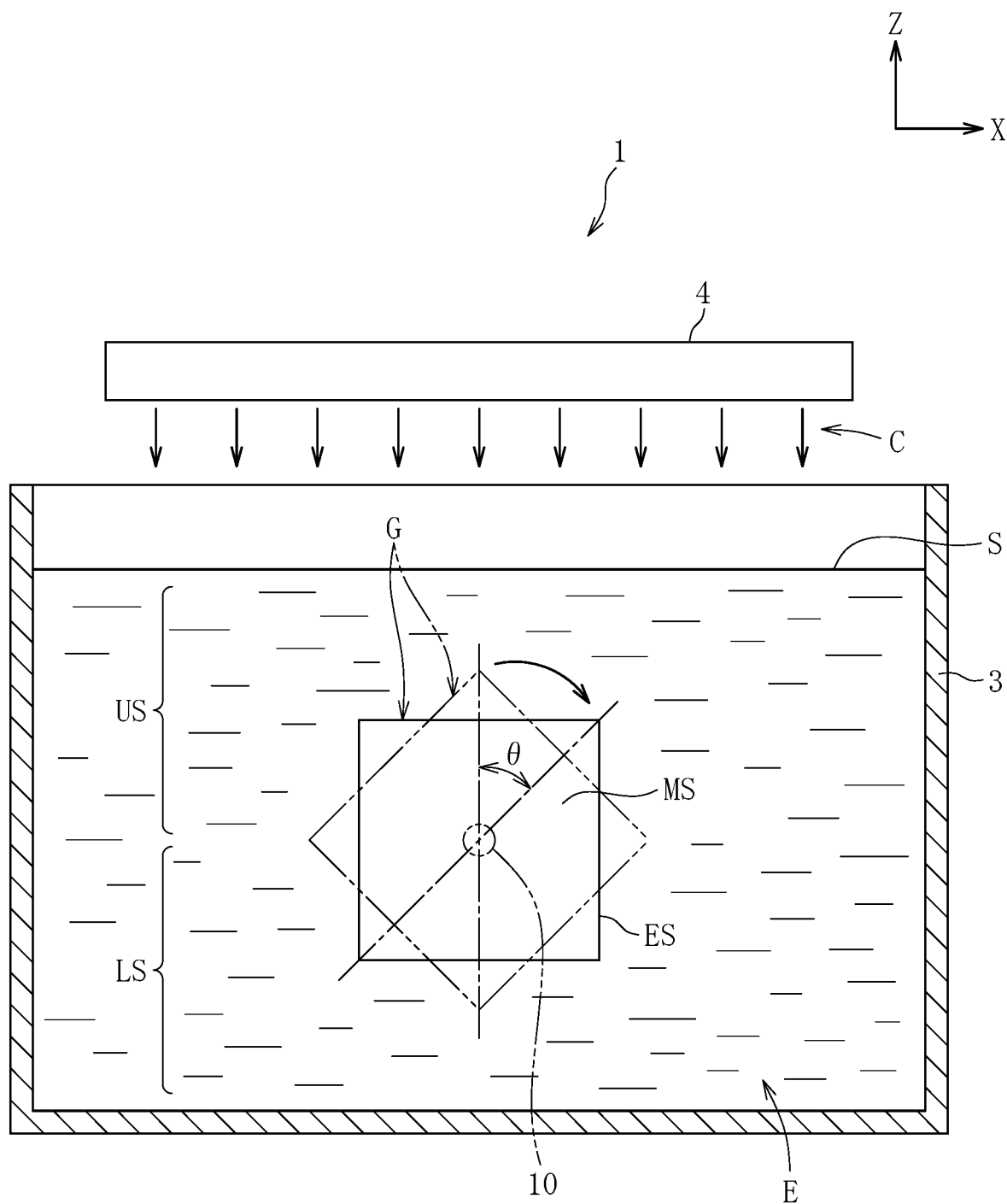
FIG. 12 is a sectional view for illustrating a step of the etching method for a glass.

When the glass sheet G is rotated intermittently, as illustrated in FIG. 12, it is desired that the following operation be repeated a plurality of times: the glass sheet G is rotated about the shaft portions 10 at an arbitrary rotation angle θ (e.g., 45°) (rotated from a position indicated by the solid line to a position indicated by the two-dot chain line), and then the rotation of the glass sheet G by the shaft portions 10 is temporarily stopped, and after a lapse of a predetermined time, the glass sheet G is rotated again.

In the etching step S2, the etching rate of the glass sheet G is desirably set to 0.001 mm/h or more and 0.1 mm/h or less.

In the etching step S2, the cooling device 4 jets the cooling gas C toward the liquid surface S of the etching liquid E (cooling step). When the cooling gas C is brought into contact with the liquid surface S, an upper region US of the etching liquid E on a liquid surface S side is cooled in the etching bath 3. That is, in the etching bath 3, the upper region US of the etching liquid E on the liquid surface S side and a lower region LS of the etching liquid E on a bottom side of the etching bath 3 have different temperatures. The cooling gas C is, for example, air cooled to 28° C. or less.

In the etching treatment apparatus 1, When the temperature of the upper region US of the etching liquid E is reduced by the cooling device 4, the etching rate of the glass sheet G is partly controlled so that uneven thickness is not caused in the glass sheet G by the etching treatment.

That is, in the etching liquid E, as the etching treatment proceeds, particles of the glass having been removed from the glass sheet G by the etching settle out and deposit at the bottom of the etching bath 3. Therefore, in the etching bath 3, owing to a difference in concentration of the particles, the glass sheet G has different etching rates in the lower region LS near the bottom thereof and the upper region US near the liquid surface S thereof. That is, when the cooling step is not performed, the etching of a portion of the glass sheet G located in the lower region LS delays, and the etching of a portion of the glass sheet G located in the upper region US proceeds relatively rapidly.

In this embodiment, the temperature of the upper region US of the etching liquid E is reduced, to thereby reduce the etching rate of the portion of the glass sheet G located in the upper region US. With this, the etching rate of the glass portion located in the upper region US is balanced with the etching rate of the glass portion located in the lower region LS, and thus the etching treatment can be uniformly performed on the surfaces MS of the glass sheet G. Accordingly, the glass sheet G having a uniform thickness can be formed.

After a lapse of a predetermined time, when the etching treatment is performed sufficiently, the etching step S2 is completed, and the subsequent washing step S3 is performed.

In the washing step S3, the holder 2 is taken out of the etching bath 3, and transferred to a washing bath separately prepared. In the washing bath, the glass sheet G held by the holder 2 is washed by jetting a washing liquid (e.g., pure water) toward the holder 2 through a nozzle.

After the washing step S3, the glass sheet G is taken out of the holder 2. Specifically, the glass sheet G is taken out of the holder 2 after, of the four (two pairs of) first holding portions 7, two (a pair of) first holding portions 7 are each changed from the first posture (holding posture) to the second posture (retreating posture). In changing the posture of the first holding portion 7, the posture of the lock member 22 of the lock portion 9 that fixes the first holding portion 7 is changed from the fixing posture to the retreating posture. With this, the protrusion 27 of the lock member 22 escapes from the opening 11c of the first holding portion 7, and the first holding portion 7 is released from being fixed and comes into a state of being changeable in its posture.

By the etching treatment apparatus 1 and the etching method according to this embodiment described above, the glass sheet G is rotated about the axis line (shaft portions 10) perpendicular to the surfaces MS of the glass sheet G in the etching step S2, and thus the etching liquid E can be caused to relatively flow along the surfaces MS of the glass sheet G. With this, the etching treatment can be uniformly performed on the surfaces MS of the glass sheet G as compared to the case in which the etching liquid E is not caused to flow. Through such etching treatment, a defect, such as microcracks, formed in the glass sheet G in a previous step can be removed. With this, the thickness of the glass sheet G can be reduced without causing breakage of the glass sheet G as compared to the case in which physical polishing is employed.

In addition, the fixing portions 13 and 19 (recesses 16 and 20) of the holding portions 7 and 8 are configured to hold the glass sheet G by being brought into contact with the edge portions EG of the glass sheet G. Accordingly, the etching treatment can be fully and uniformly performed on the surfaces MS and the end surface ES of the glass sheet G. With this, the glass sheet G after the etching step S2 can be prevented from being broken.

The four (two pairs of) first holding portions 7 in the holder 2 are configured to be changeable in posture, and hence a mounting operation of the glass sheet G to the holder 2 in the preparation step S1 and a collecting operation of taking the glass sheet G out of the holder 2 after the etching step S2 can be performed efficiently.

Figure 13:
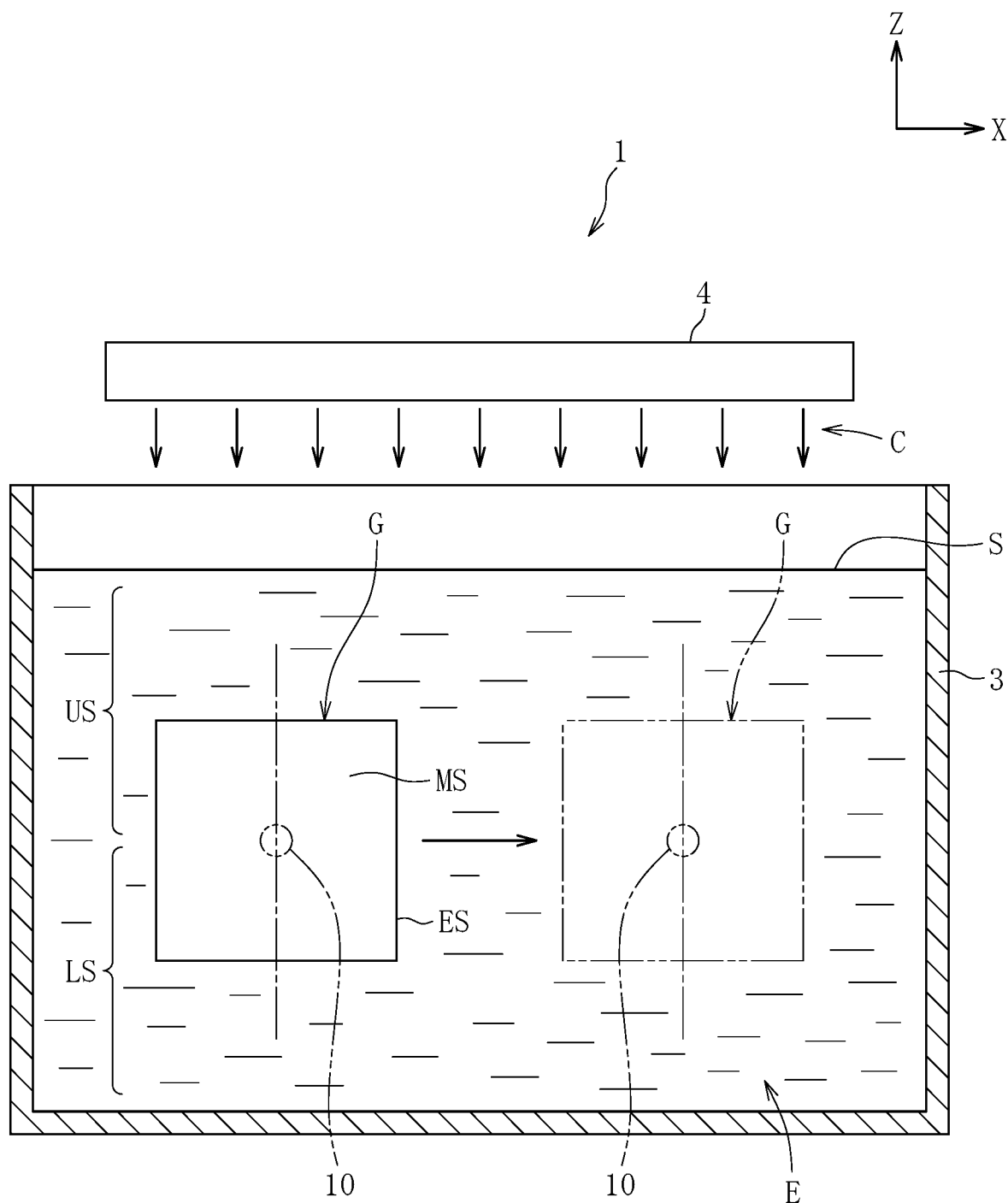
FIG. 13 is a sectional view for illustrating an etching method for a glass according to another embodiment of the present invention.

An etching method for the glass sheet G according to another embodiment of the present invention is illustrated in FIG. 13. While the etching treatment of the glass sheet G is performed by rotating the holder 2 about the shaft portions 10 in the above-mentioned embodiment, the holder 2 is moved horizontally without being rotated in the etching liquid E in this embodiment. Specifically, the holder 2 is moved in a horizontal direction perpendicular to the shaft portions 10. With this, the glass sheet G is moved linearly in a direction parallel to the surfaces MS. Also in this embodiment, the etching liquid E can be caused to relatively flow along the surfaces MS of the glass sheet G, and thus the etching treatment can be suitably performed on the glass sheet G. The glass sheet G may be moved continuously or intermittently.

Figure 14:
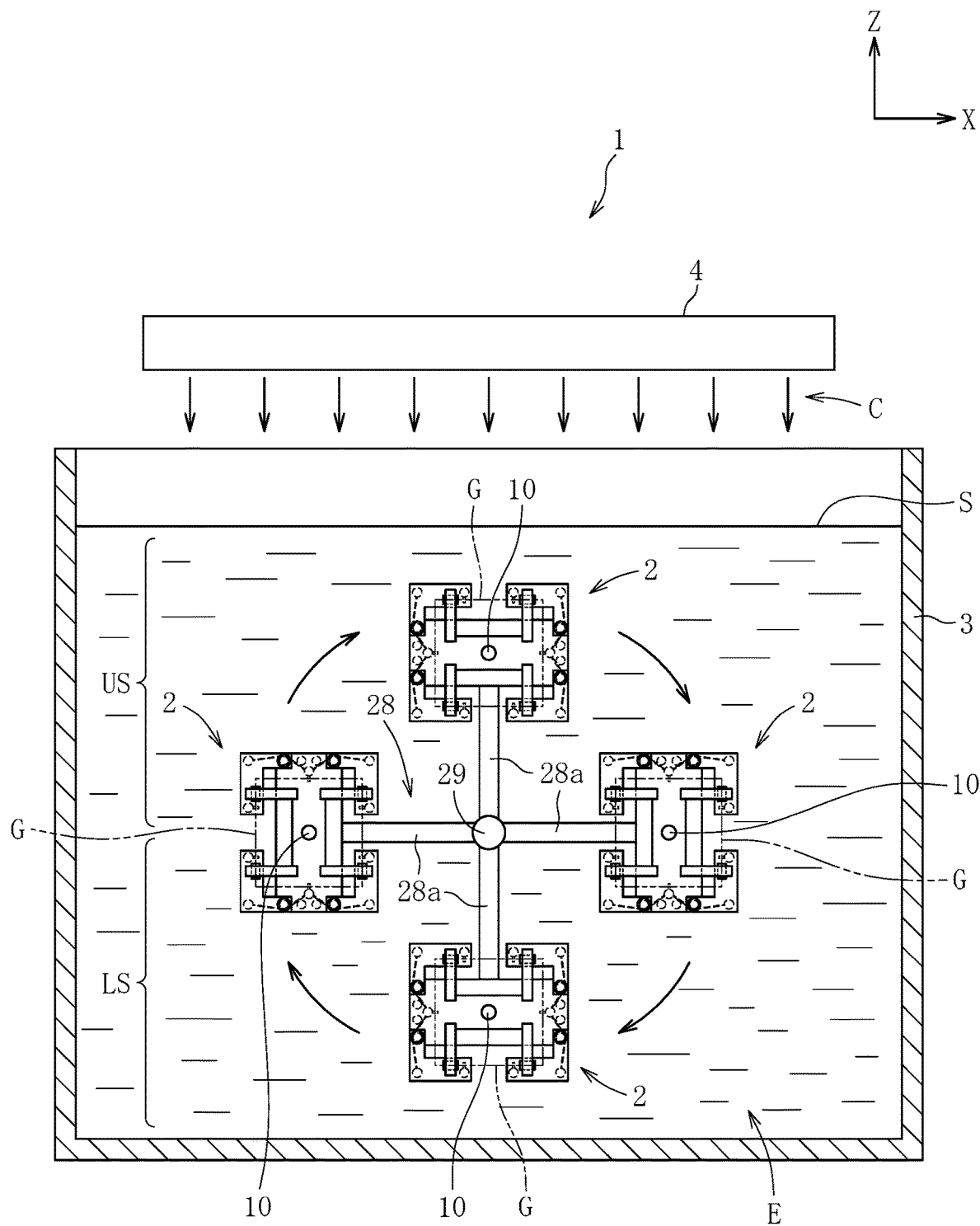
FIG. 14 is a sectional view for illustrating an etching method for a glass and an etching treatment apparatus according to another embodiment of the present invention.

An etching treatment apparatus according to another embodiment of the present invention is illustrated in FIG. 14. The etching treatment apparatus 1 according to this embodiment comprises a plurality of holders 2 (four holders 2 in the illustrated example). The holders 2 are each supported by a support member 28 in an integrated manner. The support member 28 comprises a plurality of support portions 28a configured to support the respective holders 2.

The support portions 28a each have an elongated shape. End portions of the support portions 28a are connected to the base members 5 of the respective holders 2. In addition, the support members 28 comprise a shaft portion 29 in their center portion. When the shaft portion 29 is rotationally driven by a driving source, the etching treatment apparatus 1 simultaneously rotates (revolves) the four holders 2 about the shaft portion 29. With this, the etching treatment apparatus 1 can treat a larger number of glass sheets G simultaneously. In this embodiment, the holders 2 may be rotated about the shaft portions 10 of the respective holders 2 in addition to the above-mentioned rotation (revolution).

Figure 15:
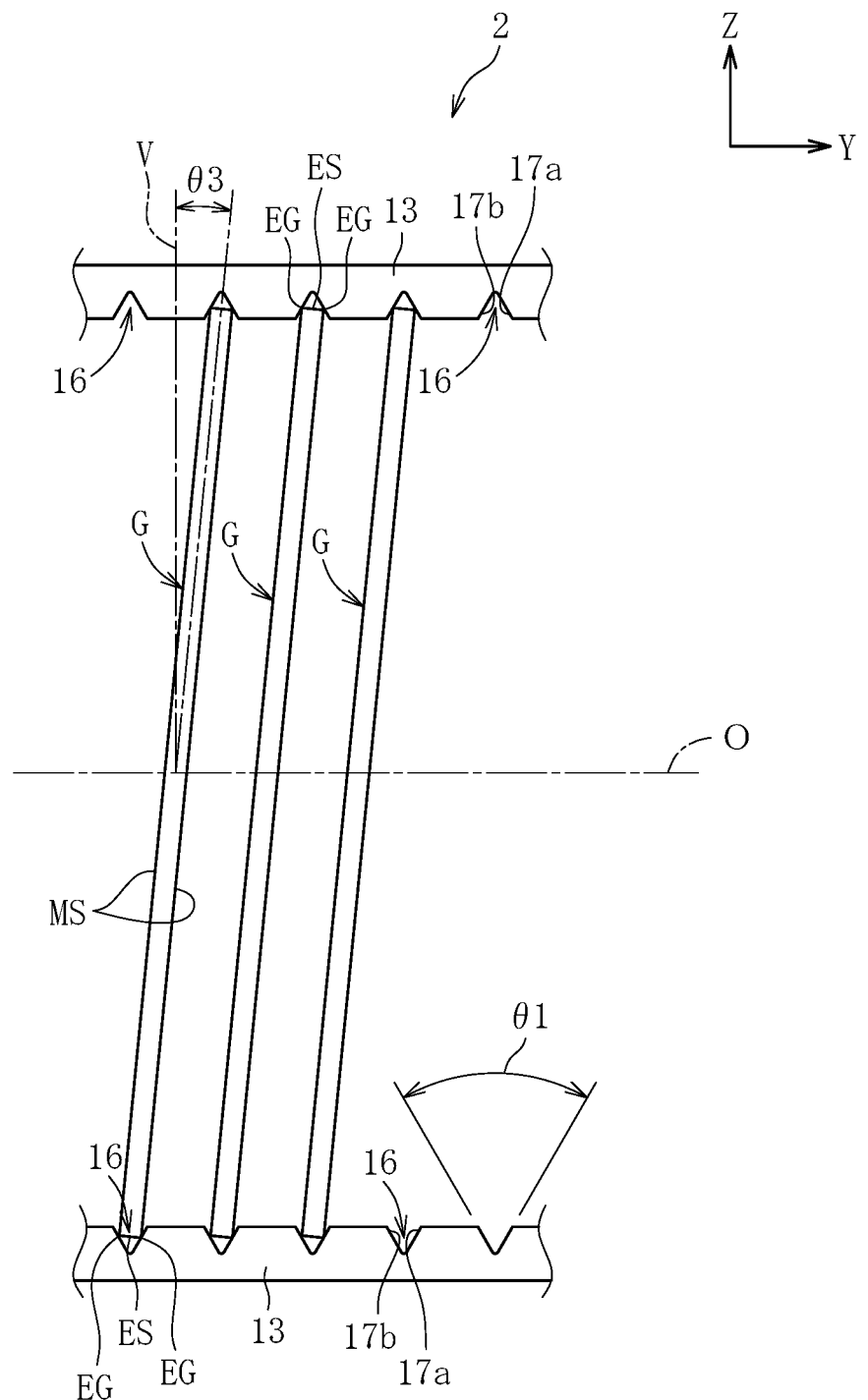
FIG. 15 is a sectional view for illustrating an etching method for a glass and an etching treatment apparatus according to another embodiment of the present invention.

An etching method and an etching treatment apparatus according to another embodiment of the present invention are illustrated in FIG. 15. While the holder 2 of the etching treatment apparatus 1 is configured to support the glass sheets G in an upright posture in the embodiment illustrated in FIG. 1 to FIG. 12, the holder 2 is configured to support the plurality of glass sheets G in an inclined posture in this embodiment. Specifically, as illustrated in FIG. 15, each glass sheet G is supported by the holder 2 (first fixing portion 13) so as to be inclined at a predetermined angle θ3 with respect to the vertical line V (line perpendicular to the axis line O passing through the center of the shaft portion 10) drawn with respect to the holder 2. The inclination angle θ3 of the glass sheet G is preferably 10° or less (0°<θ3≤10°), more preferably 5° or less. In the etching method according to this embodiment, the etching step S2 is performed by immersing the holder 2 that holds the glass sheets G in an inclined posture as described above in the etching liquid E while keeping the shaft portions 10 thereof in a horizontal state, and rotating the shaft portions 10.

Figure 16:
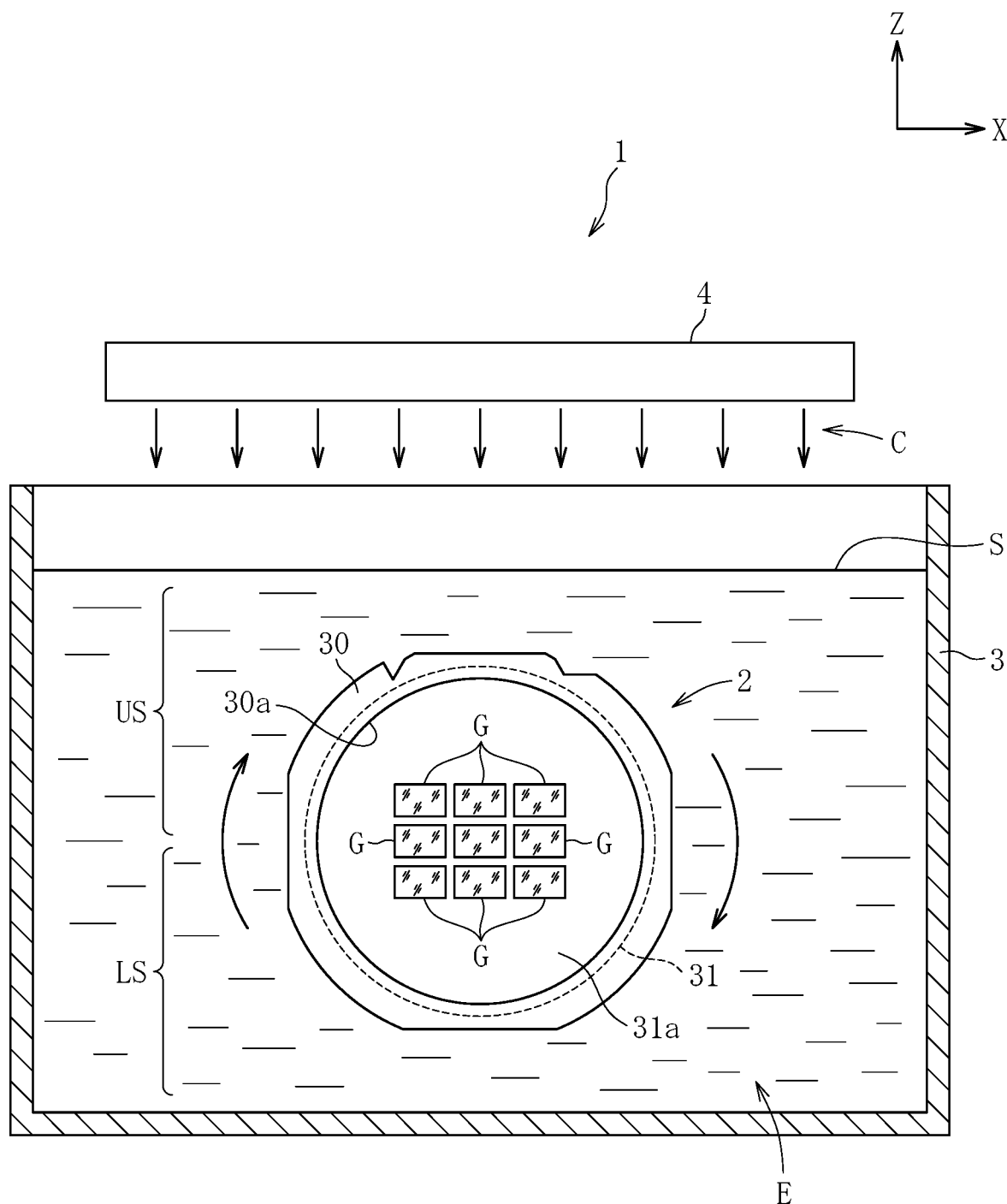
FIG. 16 is a front view for illustrating an etching method for a glass and an etching treatment apparatus according to another embodiment of the present invention.
Figure 17:
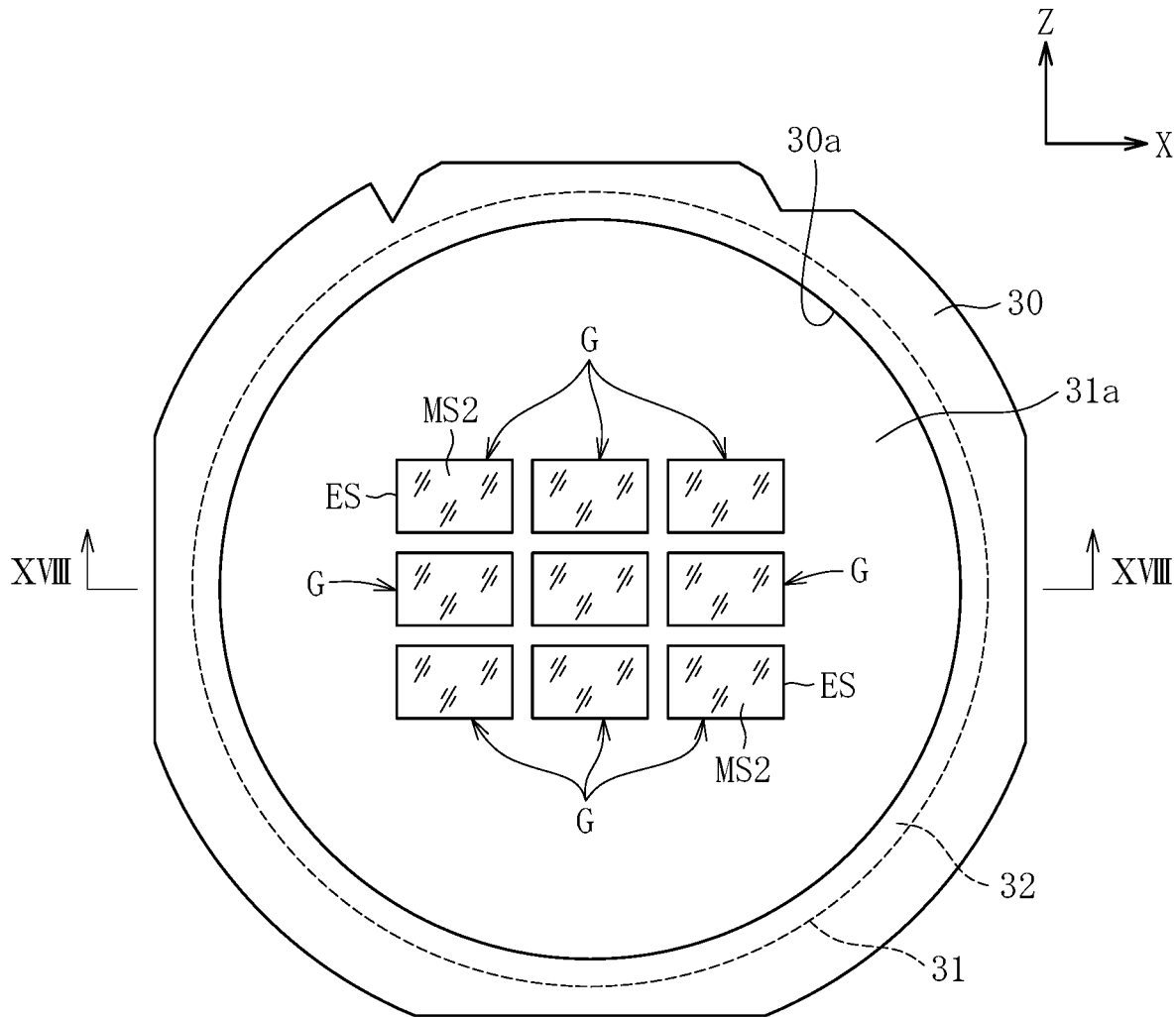
FIG. 17 is a front view of a holder.
Figure 18:
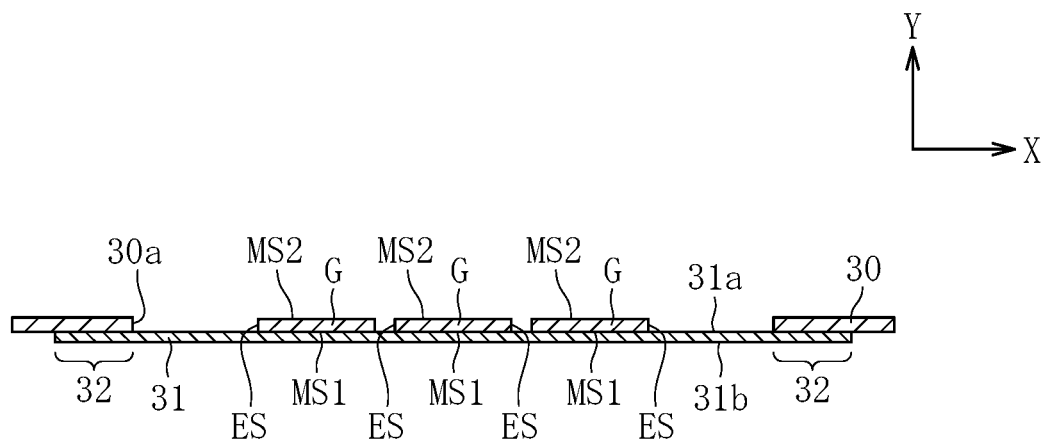
FIG. 18 is a sectional view taken along the line XVIII-XVIII of FIG. 17.

An etching method and an etching treatment apparatus according to another embodiment of the present invention are illustrated in FIG. 16 to FIG. 18. The etching treatment apparatus 1 according to this embodiment differs from the etching treatment apparatus 1 according to the above-mentioned embodiments in the configuration of the holder 2. The holder 2 comprises: a frame body 30; and a tape 31 supported by the frame body 30.

The frame body 30 is a sheet member formed of a resin or a metal into a ring shape. The thickness of the frame body 30 is preferably 0.5 mm or more and 5 mm or less. The frame body 30 comprises an opening 30a penetrating therethrough in a thickness direction. The opening 30a has a circular shape in a front view, but the shape of the opening 30a is not limited thereto. The opening 30a may have a rectangular shape or any other various shapes.

The tape 31 is formed of, for example, a stretchable transparent UV tape. The thickness of the tape 31 is set to, for example, 500 μm or less, but is not limited to this range. The tape 31 has a first main surface 31a and a second main surface 31b facing each other in a thickness direction. The first main surface 31a is a pressure-sensitive adhesive surface, and the second main surface 31b is a non-pressure-sensitive adhesive surface. The tape 31 is stuck onto one surface of the frame body 30 using the pressure-sensitive adhesive surface (first main surface 31a). In addition, the plurality of glass sheets G are attached to the pressure-sensitive adhesive surface of the tape 31.

The tape 31 has a circular shape, and its edge portion is attached to the frame body 30 to form a joint portion 32. The tape 31 is preferably stuck to the frame body 30 in a tense state so as to cover the entirety of the opening 30a. In this case, the joint portion 32 is preferably formed so as to surround the entire periphery of the opening 30a. The shape of the tape 31 is not particularly limited, and may be, for example, a polygonal shape, such as a quadrangular (square or rectangular) shape, or an elliptic shape as long as the tape 31 can cover the entirety or substantially the entirety of the opening 30a.

Now, the etching method according to this embodiment is described. First, the plurality of glass sheets G are attached to the first main surface 31a (pressure-sensitive adhesive surface) of the tape 31 (preparation step S1). In this case, one main surface MS1 of each glass sheet G is entirely covered with the first main surface 31a (pressure-sensitive adhesive surface) of the tape 31. The plurality of glass sheets G fixed to the tape 31 are spaced apart from each other at a certain interval. After that, while the tape 31 is stretched, a peripheral edge portion of the first main surface 31a is superimposed on one surface of the frame body 30. The peripheral edge portion of the first main surface 31a is stuck onto the one surface of the frame body 30. Thus, the joint portion 32 is formed.

After that, as illustrated in FIG. 16, the holder 2 is immersed in the etching liquid E in the etching bath 3 under the state in which the holder 2 supports the plurality of glass sheets G with the tape 31 (etching step S2). After that, the holder 2 is relatively moved (e.g., rotated) with respect to the etching liquid E. In the etching step S2, the etching liquid E may be cooled by the cooling device 4 (cooling step). In the etching step S2, the one main surface MS1 of each glass sheet G covered with the pressure-sensitive adhesive surface (first main surface 31a) of the tape 31 remains as it is without being etched. That is, in the etching step, the other main surface MS2 and the end surface ES of each glass sheet G are subjected to the etching treatment. After the completion of the etching step S2, the subsequent washing step S3 is performed.

Figure 19:
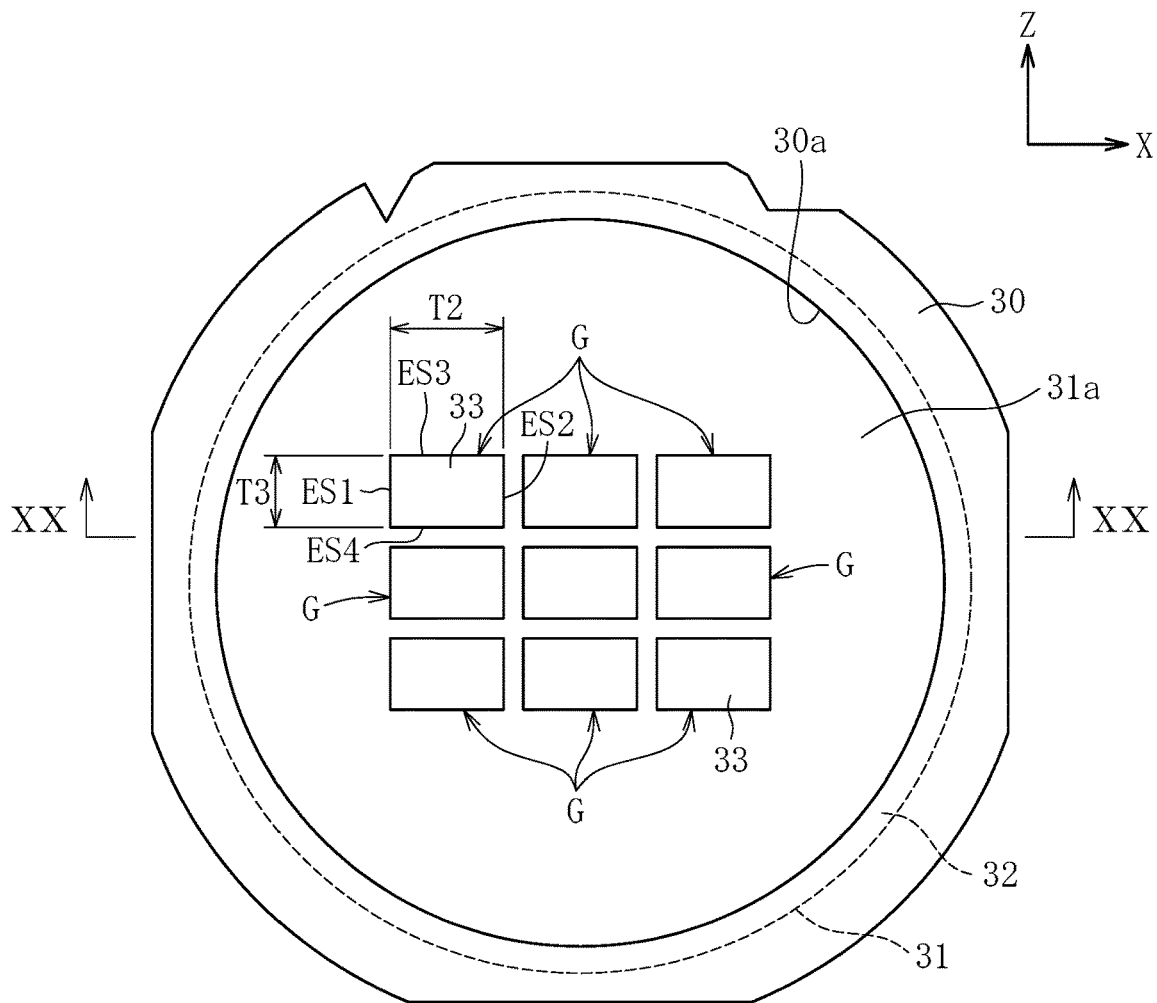
FIG. 19 is a front view of a holder for illustrating an etching method for a glass and an etching treatment apparatus according to another embodiment of the present invention.
Figure 20:
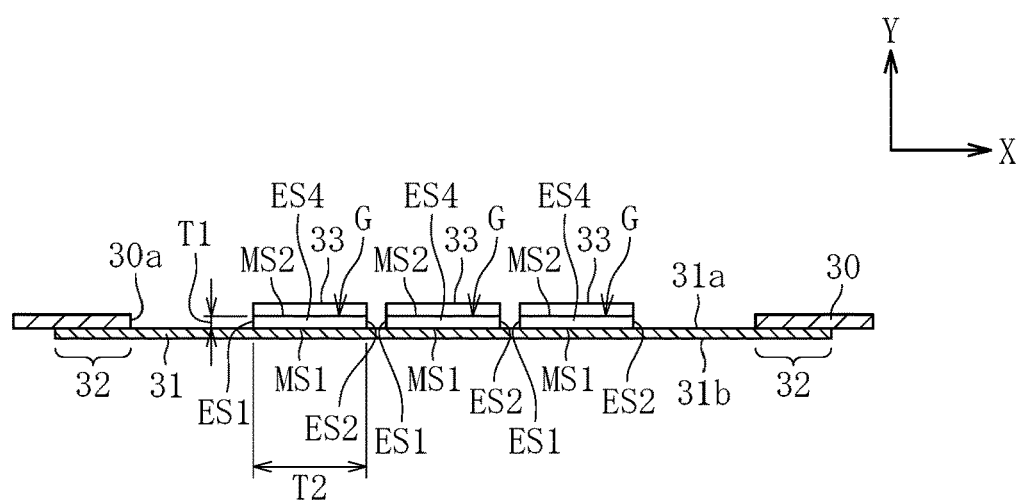
FIG. 20 is a sectional view taken along the line XX-XX of FIG. 19.

An etching method and an etching treatment apparatus according to another embodiment of the present invention are illustrated in FIG. 19 and FIG. 20. In this embodiment, the holder 2 comprising the frame body 30 and the tape 31 is used as in the embodiment illustrated in FIG. 16 to FIG. 18.

The surfaces of the glass sheet G comprise: a first main surface MS1; a second main surface MS2; and a plurality of end surfaces ES1 to ES4 each connecting the first main surface MS1 and the second main surface MS2. The end surfaces ES1 to ES4 comprise: a first end surface ES1; a second end surface ES2 facing the first end surface ES1; a third end surface ES3 intersecting with the first end surface ES (e.g., at a right angle); and a fourth end surface ES4 facing the third end surface ES3.

The first main surface MS1 of the glass sheet G is attached to the tape 31 serving as a sheet member mounted to the frame body 30. With this, the entirety of the first main surface MS1 is covered with the sheet member (tape 31). A sheet member 33 configured to cover the entirety of the second main surface MS2 is attached to the second main surface MS2 of the glass sheet G. For example, a polyolefin-based pressure-sensitive adhesive film (manufactured by Nitto Denko Corporation, ELP-BM03) is suitably used as the sheet member 33, but the configuration of the sheet member is not limited thereto.

In the following description, a distance between the first main surface MS1 and the second main surface MS2 is referred to as "first thickness T1," and a distance between the first end surface ES1 and the second end surface ES2 is referred to as "second width T2." In addition, a distance between the third end surface ES3 and the fourth end surface ES4 is referred to as "third length T3." The first thickness T1 is comparable to the thickness between the main surfaces MS in the embodiment illustrated in FIG. 1 to FIG. 12. The second width T2 and the third length T3 each have a size larger than the first thickness T1.

In the etching method according to this embodiment, when the holder 2 that holds the glass sheet G is immersed in the etching liquid E in the etching bath 3, the first main surface MS1 and the second main surface MS2 of the glass sheet G are prevented from being brought into contact with the etching liquid E because the entireties of these surfaces MS1 and MS2 are covered with the sheet members (the tape 31 and the sheet member 33). That is, in the method according to the one embodiment of the present invention, only the end surfaces ES1 to ES4 of the glass sheet G are brought into contact with the etching liquid E. In this embodiment, when the etching liquid E is caused to relatively flow with respect to the end surfaces ES1 to ES4, only the sizes of the second width T2 and the third length T3 can be reduced without reducing the first thickness T1.

Before the etching method according to this embodiment is performed, the plurality of glass sheets G may be formed by attaching the sheet member 33 to the second main surface MS2 of a large-size glass sheet, and forming notches in the second main surface MS2 and cutting (breaking) the glass sheet. After that, the first main surface MS1 of each glass sheet G is attached to the tape 31, and thus the plurality of glass sheets G can be produced efficiently. The present invention is not limited thereto, and it is also appropriate to form the plurality of glass sheets G by cutting a large-size glass sheet, and then attach the sheet member 33 to the second main surface MS2 of each glass sheet G.

In addition, while the configuration in which all the end surfaces ES1 to ES4 are brought into contact with the etching liquid E is presented as an example in the foregoing, it is also appropriate to cover any of the end surfaces ES1 to ES4 with the sheet member 33, to thereby make only a specific end surface etchable (changeable in surface state).

The present invention is not limited to the configurations of the above-mentioned embodiments. In addition, the action and effect of the present invention are not limited to those described above. The present invention may be modified in various forms within the range not departing from the spirit of the present invention.

While an example in which the etching treatment is performed by rotating the glass sheet G to cause the etching liquid E to relatively flow with respect to the surfaces MS of the glass sheet G in the etching treatment apparatus 1 is presented in the above-mentioned embodiments, the configuration of the present invention is not limited thereto. For example, it is also appropriate to stir the etching liquid E under the state in which the holder 2 is stopped in the etching liquid E, to thereby cause the etching liquid E to relatively flow along the surfaces MS of the glass sheet G.

While the glass sheet G is presented as an example of the glass to be subjected to the etching treatment in the above-mentioned embodiments, the present invention is not limited thereto. The present invention can be applied to glasses having various shapes, such as a block shape and a rod shape.

While an example in which the upper region US of the etching liquid E is cooled by jetting the cooling gas C from the cooling device 4 arranged above the etching bath 3 is presented in the above-mentioned embodiments, the configuration of the present invention is not limited thereto. For example, it is also appropriate to cool the etching liquid E by immersing a cooling device capable of circulating a cooling medium in its inside in the upper region US of the etching liquid E.

While an example in which the etching step S2 is performed by rotating the glass sheet G about a geometric center (shaft portions 10) of the glass sheet G is presented in the above-mentioned embodiments, the configuration of the present invention is not limited thereto. It is also appropriate to rotate the glass sheet G about a rotation axis that is eccentric with respect to the geometric center of the glass sheet G.

While an example in which the etching treatment is performed on the phosphate-based glass sheet G is presented in the above-mentioned embodiments, the present invention is not limited thereto. The etching treatment apparatus 1 can treat glass sheets G formed of various materials. Silicate glass and silica glass are each used as the material of the glass sheet G to be treated. More specific examples thereof include borosilicate glass, soda-lime glass, aluminosilicate glass, chemically tempered glass, and alkali-free glass. The "alkali-free glass" refers to glass substantially free of an alkaline component (alkali metal oxide), and specifically refers to glass having a weight ratio of an alkaline component of 3,000 ppm or less. When any of those silicate glass and silica glass is treated, a treatment liquid, such as hydrofluoric acid, is used as the etching liquid E.

By the etching method according to each of the above-mentioned embodiments of the present invention, a thin glass sheet that cannot be achieved through conventional polishing can be obtained. For example, the phosphate-based glass sheet having the above-mentioned composition is fragile as compared to a silicate glass sheet, and it is difficult to reduce the thickness of the phosphate-based glass sheet to 0.2 mm or less through polishing processing. However, by the etching method of the present invention, the average thickness of the phosphate-based glass sheet can be reduced to 0.2 mm or less, preferably from about 0.07 mm to about 0.15 mm. In addition, by the etching method of the present invention, the uneven thickness of the glass sheet G after the etching treatment can be reduced to be extremely small, for example, to 15 μm or less, preferably 9 μm or less. In addition, a change amount of the uneven thickness before and after the etching processing can be set to 15 μm or less, preferably 9 μm or less. The uneven thickness may be determined as a difference between a maximum thickness and a minimum thickness.

REFERENCE SIGNS LIST 1 etching treatment apparatus
2 holder
3 etching bath
4 cooling device
30 frame body
31 tape
33 sheet member
C cooling gas
E etching liquid
G glass (glass sheet)
MS surface of glass sheet
US upper region of etching liquid
S liquid surface of etching liquid
S2 etching step

The invention claimed is:

1. An etching method for a glass, the etching method comprising an etching step of immersing a glass in an etching liquid to subject the glass to etching treatment,
wherein the etching step comprises causing the etching liquid to relatively flow with respect to a surface of the glass, to thereby subject the glass to the etching treatment,
wherein the glass comprises a phosphate-based glass comprising as a composition, in terms of mass %, 25% or more of $P_2O_5$, and
wherein the etching liquid comprises an alkali salt of a chelating agent as an alkaline component.

2. The etching method for a glass according to claim 1, wherein the etching step comprises causing the etching liquid to relatively flow with respect to the surface of the glass at a speed of 10 m/sec or less, to thereby subject the glass to the etching treatment.

3. The etching method for a glass according to claim 1, wherein the glass comprises a glass sheet, and
wherein the etching step comprises immersing the glass sheet under a state in which the glass sheet is held by a holder.

4. The etching method for a glass according to claim 3, wherein surfaces of the glass sheet comprise: a first main surface; a second main surface; and an end surface connecting the first main surface and the second main surface,
wherein the first main surface and the second main surface are each covered with a sheet member, and
wherein the etching step comprises causing the etching liquid to relatively flow with respect to only the end surface of the glass, to thereby subject the glass to the etching treatment.

5. The etching method for a glass according to claim 3, wherein the glass is held in an upright posture by the holder.

6. The etching method for a glass according to claim 3, wherein the holder comprises: a frame body; and a tape stuck to the frame body, and
wherein the glass sheet is held by the holder under a state in which one main surface of the glass sheet is attached to the tape.

7. The etching method for a glass according to claim 3, wherein the etching step comprises moving the holder in the etching liquid.

8. The etching method for a glass according to claim 7, wherein the etching step comprises setting an etching rate to 0.001 mm/h or more and 0.1 mm/h or less, and rotating the holder at a speed of 10 rpm or less.

9. The etching method for a glass according to claim 7, wherein the glass is held in an upright posture by the holder.

10. The etching method for a glass according to claim 7, wherein the etching step comprises continuously rotating the holder in the etching liquid.

11. The etching method for a glass according to claim 10, wherein the etching step comprises setting an etching rate to 0.001 mm/h or more and 0.1 mm/h or less, and rotating the holder at a speed of 10 rpm or less.

12. The etching method for a glass according to claim 10, wherein the glass is held in an upright posture by the holder.

13. The etching method for a glass according to claim 7, wherein the etching step comprises intermittently rotating the holder in the etching liquid.

14. The etching method for a glass according to claim 13, wherein the etching step comprises setting an etching rate to 0.001 mm/h or more and 0.1 mm/h or less, and rotating the holder at a speed of 10 rpm or less.

15. The etching method for a glass according to claim 13, wherein the glass is held in an upright posture by the holder.

16. An etching method for a glass, the etching method comprising an etching step of immersing a glass in an etching liquid to subject the glass to etching treatment,
wherein the etching step comprises causing the etching liquid to relatively flow with respect to a surface of the glass, to thereby subject the glass to the etching treatment,
wherein the etching liquid is accommodated in an etching bath, and
wherein the etching step further comprises a cooling step of cooling an upper region of the etching liquid.

17. The etching method for a glass according to claim 16, wherein the cooling step comprises bringing a cooling gas into contact with a liquid surface of the etching liquid.

* * * * *